United States Patent
Chipner et al.

(10) Patent No.: US 7,074,250 B1
(45) Date of Patent: Jul. 11, 2006

(54) AIR FILTRATION UNIT

(75) Inventors: Todd Chipner, Jackson, TN (US);
Mark A. Etter, Humboldt, TN (US);
Angela D. Shelton, Anderson, SC (US);
Leslie D. Gist, Hunterville, NC (US);
John C. Smith, Denver, NC (US);
Charles Chen, Taichung (TW)

(73) Assignee: Black & Decker Inc., Newark, DE (US)

( * ) Notice: Subject to any disclaimer, the term of this patent is extended or adjusted under 35 U.S.C. 154(b) by 34 days.

(21) Appl. No.: 10/741,810

(22) Filed: Dec. 19, 2003

Related U.S. Application Data

(63) Continuation-in-part of application No. 10/254,858, filed on Sep. 25, 2002, now abandoned.

(51) Int. Cl.
*B01D 50/00* (2006.01)

(52) U.S. Cl. ............... 55/472; 55/385.2; 55/481; 55/486; 55/495; 95/273; 95/286; 96/224; 96/397

(58) Field of Classification Search ........... 55/385.1, 55/385.2, 472, 473, DIG. 36, 471, 481, 486, 55/495; 96/417, 418, 423, 224, 397; 95/273, 95/286
See application file for complete search history.

(56) References Cited

U.S. PATENT DOCUMENTS

| | | | | | |
|---|---|---|---|---|---|
| 2,675,094 | A | * | 4/1954 | Young ........................ | 55/480 |
| 3,577,710 | A | * | 5/1971 | Feldman ..................... | 96/140 |
| 4,526,592 | A | * | 7/1985 | Armbruster ................. | 96/121 |
| 5,139,546 | A | * | 8/1992 | Novobilski .................. | 96/142 |
| 5,443,625 | A | * | 8/1995 | Schaffhausen .............. | 95/113 |
| 5,704,955 | A | * | 1/1998 | Giles ........................... | 96/26 |
| 6,036,736 | A | * | 3/2000 | Wallace et al. ............ | 55/385.2 |
| 6,099,607 | A | * | 8/2000 | Haslebacher ................ | 55/356 |
| 6,142,142 | A | * | 11/2000 | Woodall et al. ......... | 126/299 R |
| 6,487,075 | B1 | * | 11/2002 | Negishi ..................... | 361/695 |
| 6,527,838 | B1 | * | 3/2003 | Volo et al. ................. | 96/134 |
| 6,712,889 | B1 | * | 3/2004 | Pillion et al. ............... | 96/418 |
| 6,773,477 | B1 | * | 8/2004 | Lindsay ..................... | 55/385.3 |
| 6,797,042 | B1 | * | 9/2004 | LaFerriere et al. ......... | 95/273 |
| 2005/0132681 | A1 | * | 6/2005 | Chu ............................ | 55/471 |

\* cited by examiner

*Primary Examiner*—Minh-Chau T. Pham
(74) *Attorney, Agent, or Firm*—Adan Ayala

(57) ABSTRACT

An air filtration unit for use in a work environment includes a housing disposed with an air filtration system and light source. The housing includes a handle and corner caps to prevent damage and provide stability. The air filtration system draws air into the housing, via a blower, through a first and second inlet gate, the air is at least partially filtered by a first and second filter assembly, which provide a two stage filtering, and then the at least partially filtered air is blown through an exhaust conduit back out into the work environment.

20 Claims, 25 Drawing Sheets

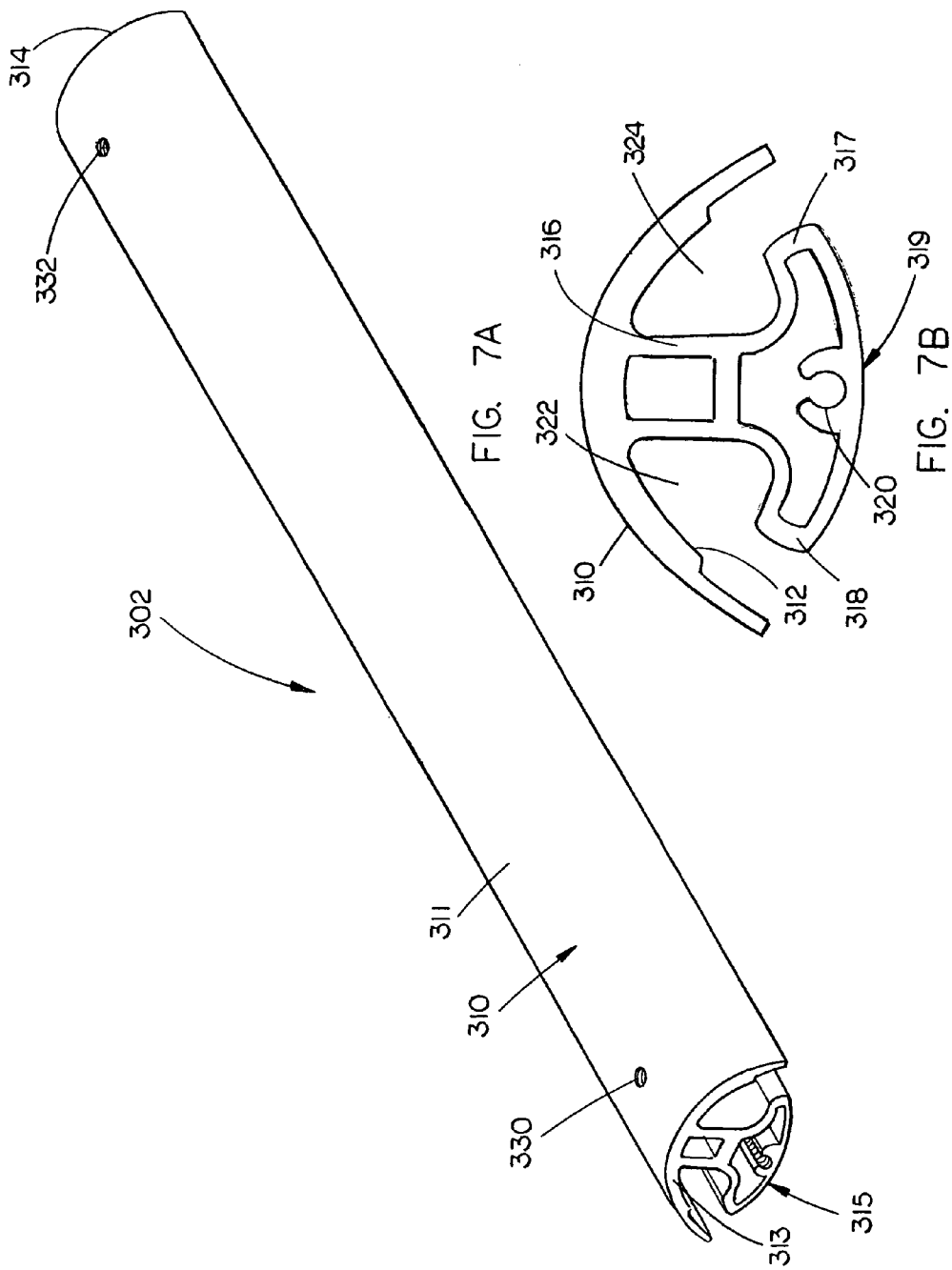

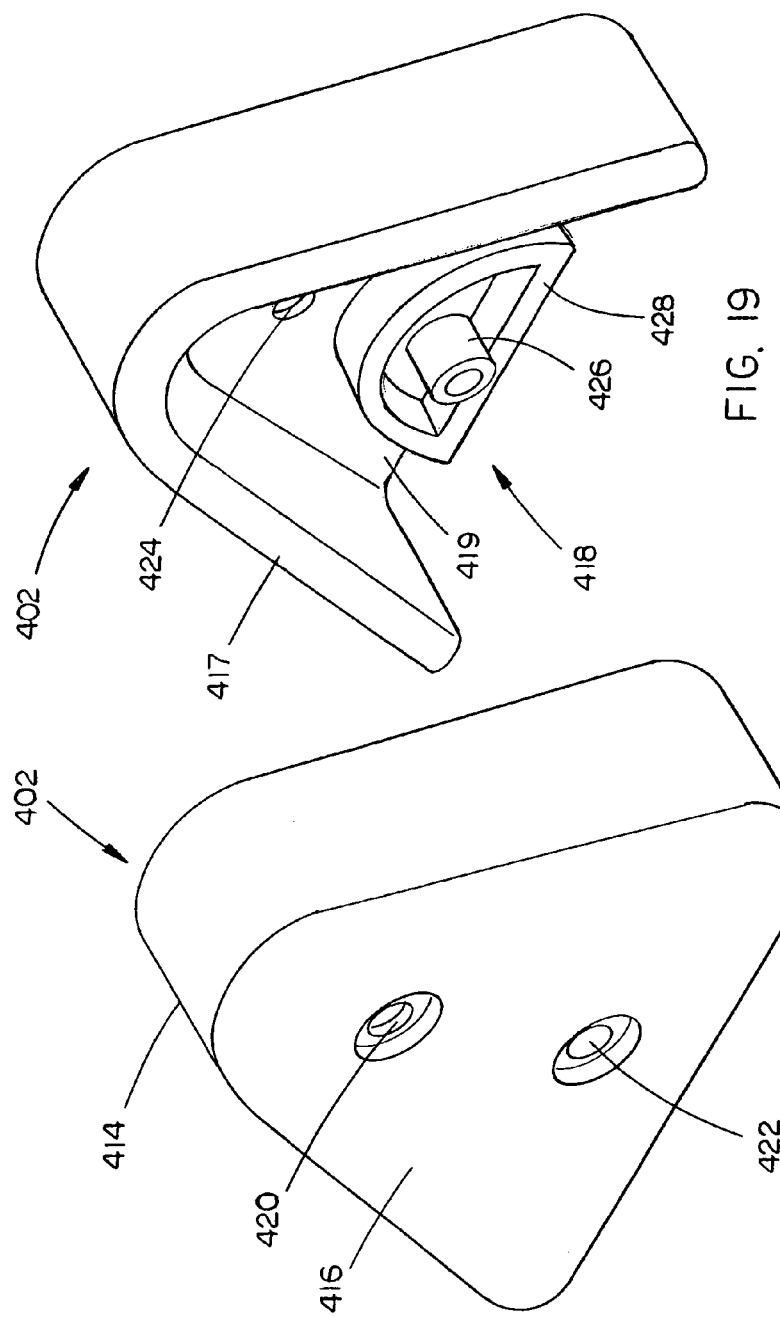

AIR FILTRATION UNIT

CROSS REFERENCE TO RELATED APPLICATION

The present application claims priority under 35 U.S.C. §120 as a continuation-in-part from U.S. application Ser. No. 10/254,858, filed on Sep. 25, 2002, now abandoned which is herein incorporated by reference in its entirety.

FIELD OF THE INVENTION

The present invention generally relates to the field of air filtration, and particularly to an air filtration unit capable of collecting dust and other harmful airborne particles as well as providing a light source.

BACKGROUND OF THE INVENTION

Dust and other loose airborne materials may be experienced on a daily basis in many work environments, such as wood working shops. For example, the cutting, sanding and shaping of wood products produce airborne particles that may cause harm to an operator who is unaware of the risk or not properly protected. These same risks exist for the craftsman at home working in their workshop.

Air filtration systems employ a variety of different systems, from filtering screens to ionic cleansers. Additionally, these systems come in a variety of configurations, from floor mounted upright models, to window sill mounted models, to models that may be mounted on ceilings and walls. However, many such air filtration systems have been limited in functionality to only providing air filtering. Further, the capacity to filter air of the air filtration system is often limited due to the dimensions of the product the air filtration system is presented in. For instance, consumer interest may require a product which takes up limited space therefore requiring the size of the air filters to be reduced to accommodate this need.

In workplace environments, when an operator needs light or a power connection the operator may have to look to multiple devices to provide such functionality. Such a multiplicity leads to clutter and may occupy valuable workspace. Further, these devices may be inconvenient for a user if they do not meet the needs of the situation. For as long as these separate technologies have been available no one has combined air filtration capabilities along with a light and power outlet source in one device.

Therefore, a device that is capable of providing air filtration and maximizing air filtering capacity, as well as, providing a light source would be desirable.

SUMMARY OF THE INVENTION

Accordingly, the present invention is directed to an air filtration unit capable of providing filtering of dust and other loose airborne materials, as well as, providing a light source.

In an aspect of the present invention the air filtration unit includes a housing which provides transportability and protection to the unit. The housing is disposed with a two stage air filtration system and a light source. Air enters through a first and second inlet gate and is filtered by the air filtration system before being passed back out into the environment. The lighting provides illumination to an area and the air filtration unit is adaptable to be utilized in a wide variety of environments.

In another aspect of the present invention the air filtration unit includes an indicator which monitors the flow of air through an air filtration system. A housing, which is disposed with the air filtration system and a light source also includes this indicator. The air enters through a first and second inlet gate and is filtered by the air filtration system before being passed back out into the environment. A user is capable of determining when an air filter within the air filtration system is in need of being replaced using the indicator.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 7A is an illustration of an extruded tube assembly in accordance with an exemplary embodiment of the present invention;

FIG. 7B is an expanded side elevation view of the extruded tube assembly of FIG. 7A;

FIG. 18 is a front plan view of a corner cap in accordance with an exemplary embodiment of the present invention;

FIG. 19 is a back plan view of the corner cap of FIG. 18;

DETAILED DESCRIPTION OF THE INVENTION

Figure 1:
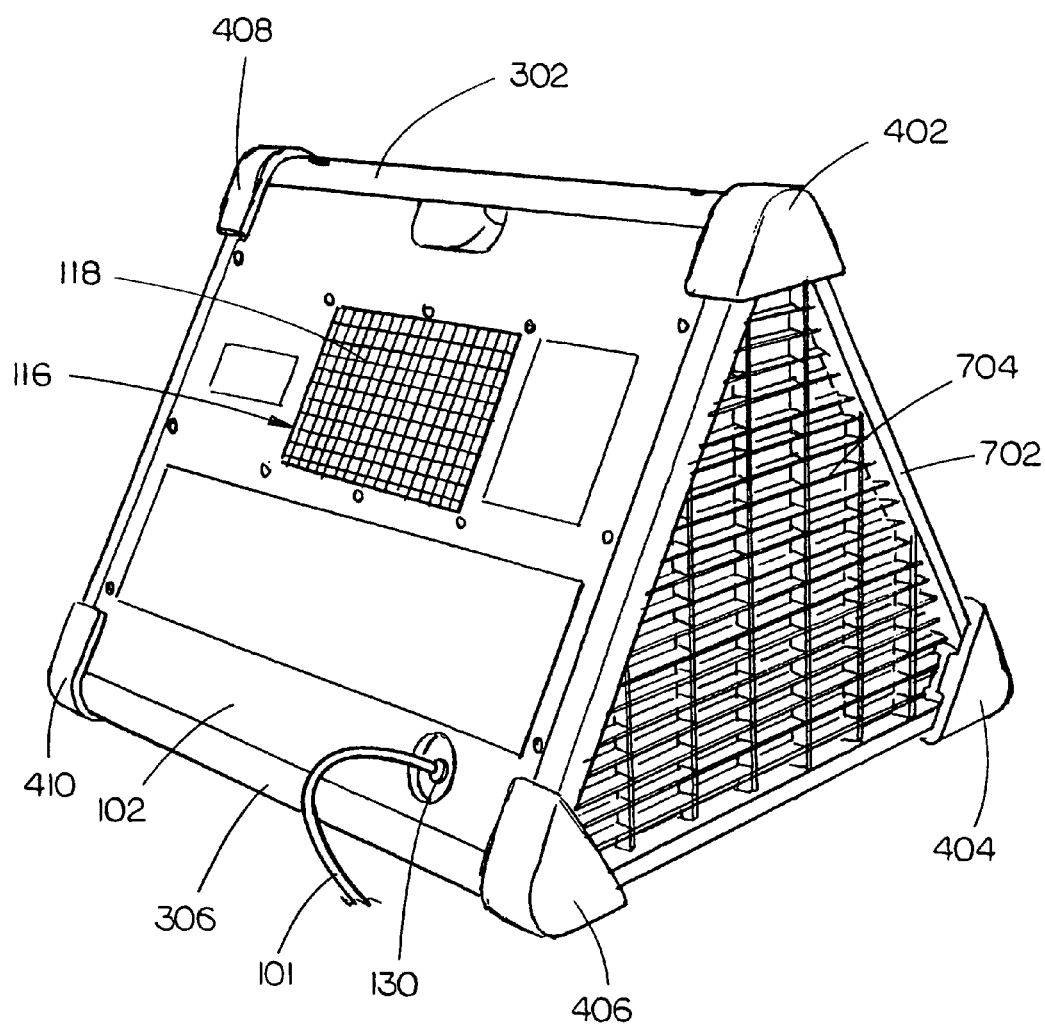
FIG. 1 is an isometric view illustrating an exemplary embodiment of an air filtration unit of the present invention.

Reference will now be made in detail to the presently preferred embodiments of the invention, examples of which are illustrated in the accompanying drawings.

Referring generally now to FIGS. 1 through 25, an air filtration unit 100 is shown and described. In this preferred embodiment, the air filtration unit 100 is configured in a substantially triangular form, similar to that shown and described for air filtration unit 100. The air filtration unit 100 includes a first side panel 102, a second side panel 104, a bottom panel 106, a first end panel 702, and a second end panel 706. A first inlet gate 112 is disposed within the first end panel 108 and a second inlet gate 114 is disposed within the second end panel 110. The first and second inlet gate 112 and 114 enable air and debris, such as particulate matter, and the like, to be drawn through a first filter system 502 and a second filter system 508 by a blower 501, described in detail below. Power for the operation of the blower 501 is provided by a standard power cord 101 which may be coupled with a standard power outlet. The first side panel 102 further includes an exhaust conduit 116, in the current embodiment the exhaust conduit 116 is an aperture, of a substantially rectangular shape, through the first side panel 102. The exhaust conduit 116 is coupled with the blower 501 and enables the at least partially filtered air, drawn in through the first and second filter 502 and 508, to be exhausted out into the environment. It is understood that the configuration and location of the exhaust conduit 116 may vary as contemplated by one of ordinary skill. For example, the exhaust conduit 116 may be configured in a substantially cylindrical shape and be disposed on the second side panel 104. A screen 118 is affixed across the exhaust conduit 116 on the first side panel 102. In the current embodiment, the screen 118 is a wire mesh, such as a standard chicken wire mesh. It is understood that the screen 118 may be composed of various materials and comprise an additional filter of varying configurations as contemplated by one of ordinary skill.

Figure 5:
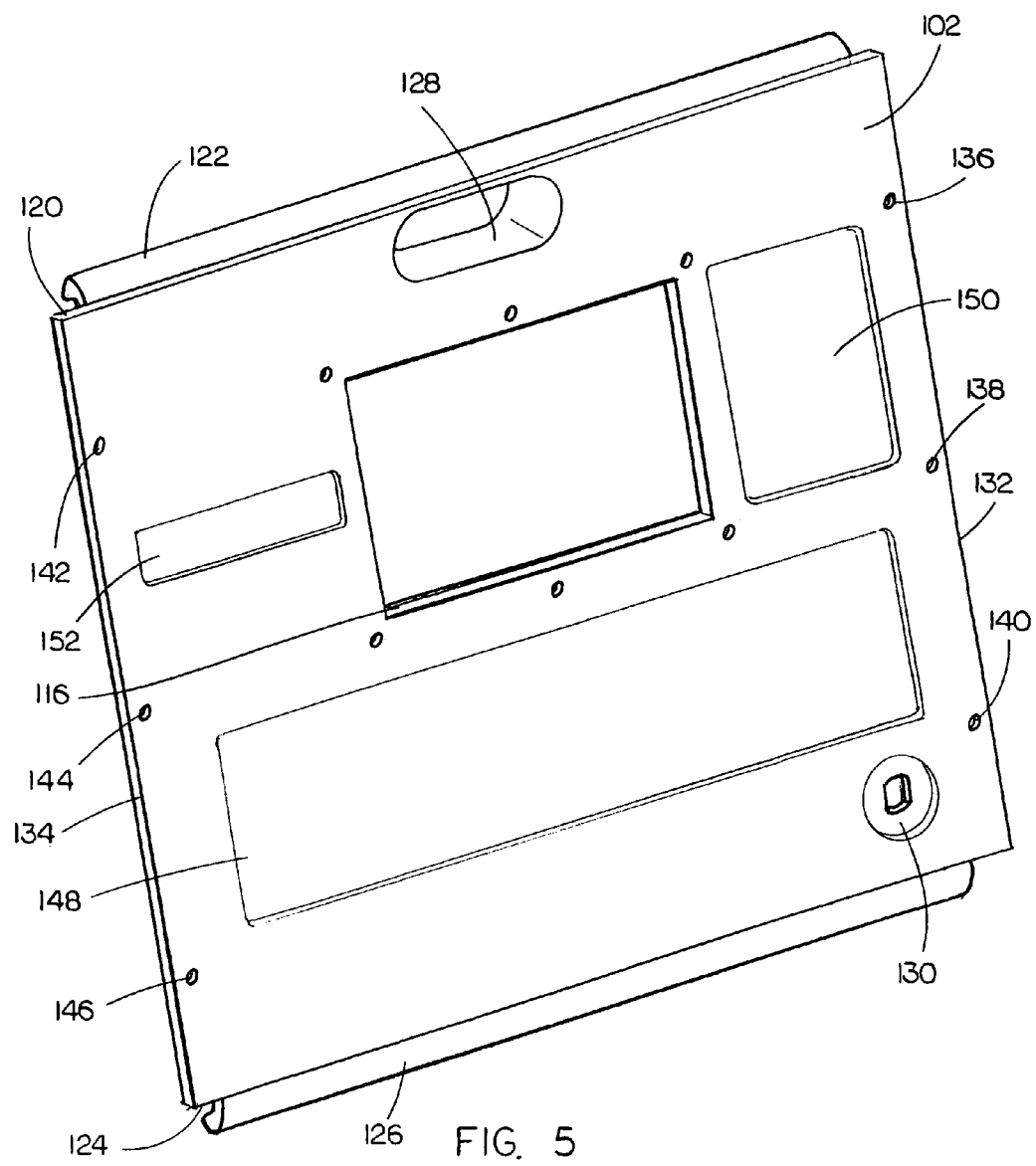
FIG. 5 is an isometric view illustrating a first side panel of the air filtration unit of FIG. 1.

In FIG. 5, a top edge 120 of the first side panel 102 is disposed with a first tongue member 122. A bottom edge 124 is disposed with a second tongue member 126. In the current embodiment, the first and second tongue member 122 and 126 extend substantially the entire length of the top and bottom edge 120 and 124, respectively. Alternatively, the first and second tongue members may vary in length to meet a desired length specification. For example, the first and second tongue members may extend substantially half the length or three-quarters of the length of the top and bottom edges, respectively. A first handle region 128 is disposed proximally, along the top edge 120. A power coupling receiver 130 is disposed proximal to the bottom edge 124. The power coupling receiver 130 enables the power cord 101 to couple with the blower 501. It is contemplated that various power supplies may be used with the present invention, such as batteries, fuel cells, rechargeable batteries, and the like. A right side 132 and a left side 134, of the first side panel 102, are disposed with multiple fastening points 136, 138, 140, 142, 144, and 146, for engagement by a fastener, such as a bolt, screw, pin, and the like. As will be shown and described below, the fasteners engage through the multiple fastening points on the first side panel 102 into multiple fastening points located on the first and second end panels.

In an alternative embodiment, the right side 132 may include a tongue extension member and the left side 134 may include a tongue extension member. These tongue extension members may be received into the first and second end panels and fastened in place by multiple fastening assemblies. The fastening system may provide a tool-less assembly mechanism to the user of the air filtration unit 100. This may be advantageous to the user making assembly simpler and reducing the number of parts needed. Further, the cost of manufacture may be decreased through use of various fastening assemblies, such as clip fastening assemblies, and the like.

In the current embodiment, the first side panel 102 further includes a first recessed panel 148, a second recessed panel 150, and a third recessed panel 152. The recessed panels may serve a variety of functions, in the exemplary embodiment shown the first and second recessed panel 148 and 150 allow for the application of labels containing warnings, directions for use, and the like. The third recessed panel 152 is used to display a name plate of the product. For example, a label printed with the product name may be incorporated into this recessed panel. The labels may include text, graphics, or other communication forms as contemplated by one of ordinary skill to communicate a desired message. It is contemplated that the recessed panels may be engraved with a desired statement or a placard, including the desired message, may be attached to the recessed panels. It is understood that the configuration of the first, second, and third recessed panel 148, 150, and 152 may vary to accommodate a wide range of features.

Figure 6:
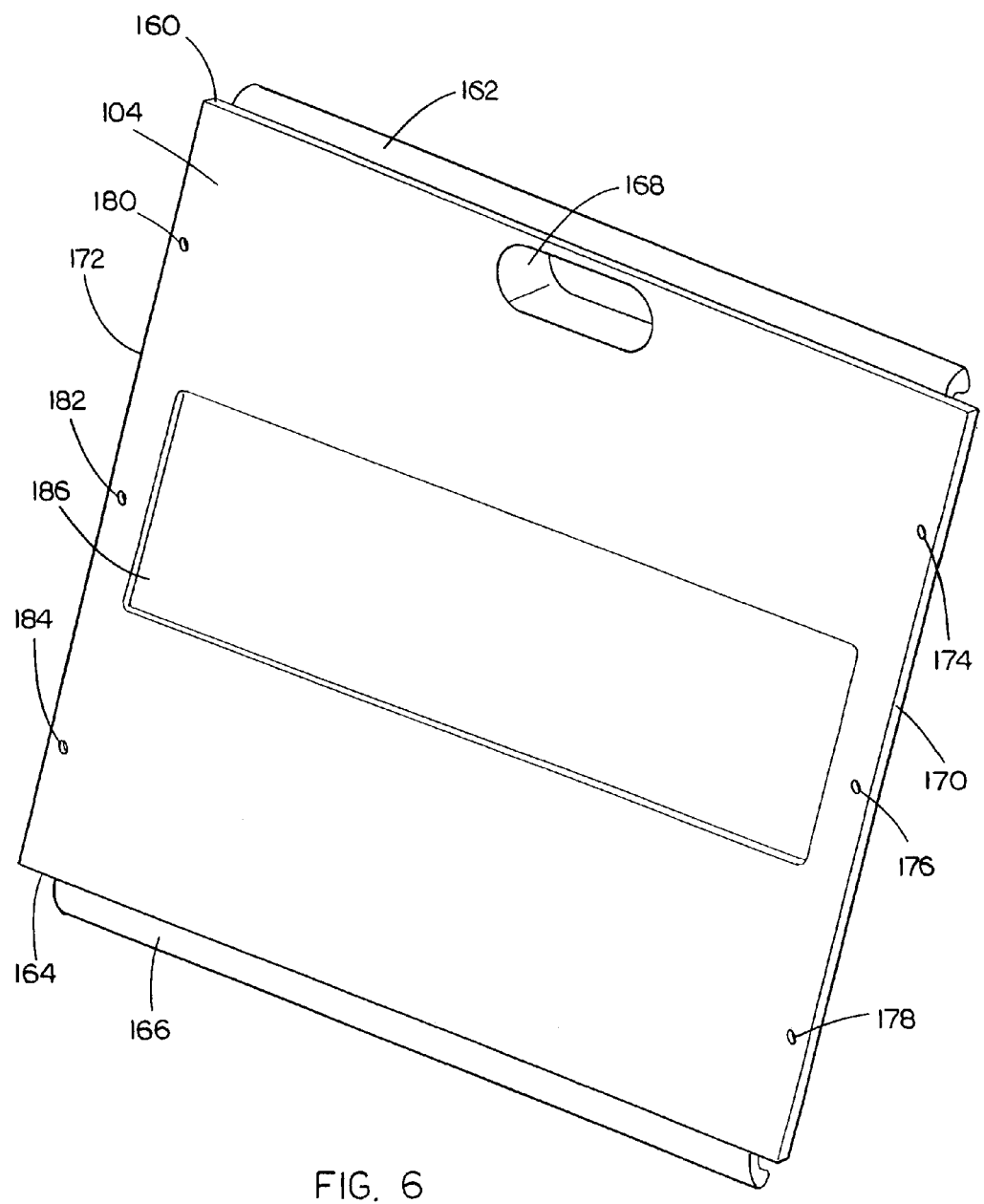
FIG. 6 is an isometric view illustrating a second side panel of the air filtration unit of FIG. 1, including a top edge disposed with a first tongue member, a bottom edge disposed with a second tongue member, and a handle.
Figure 8A:
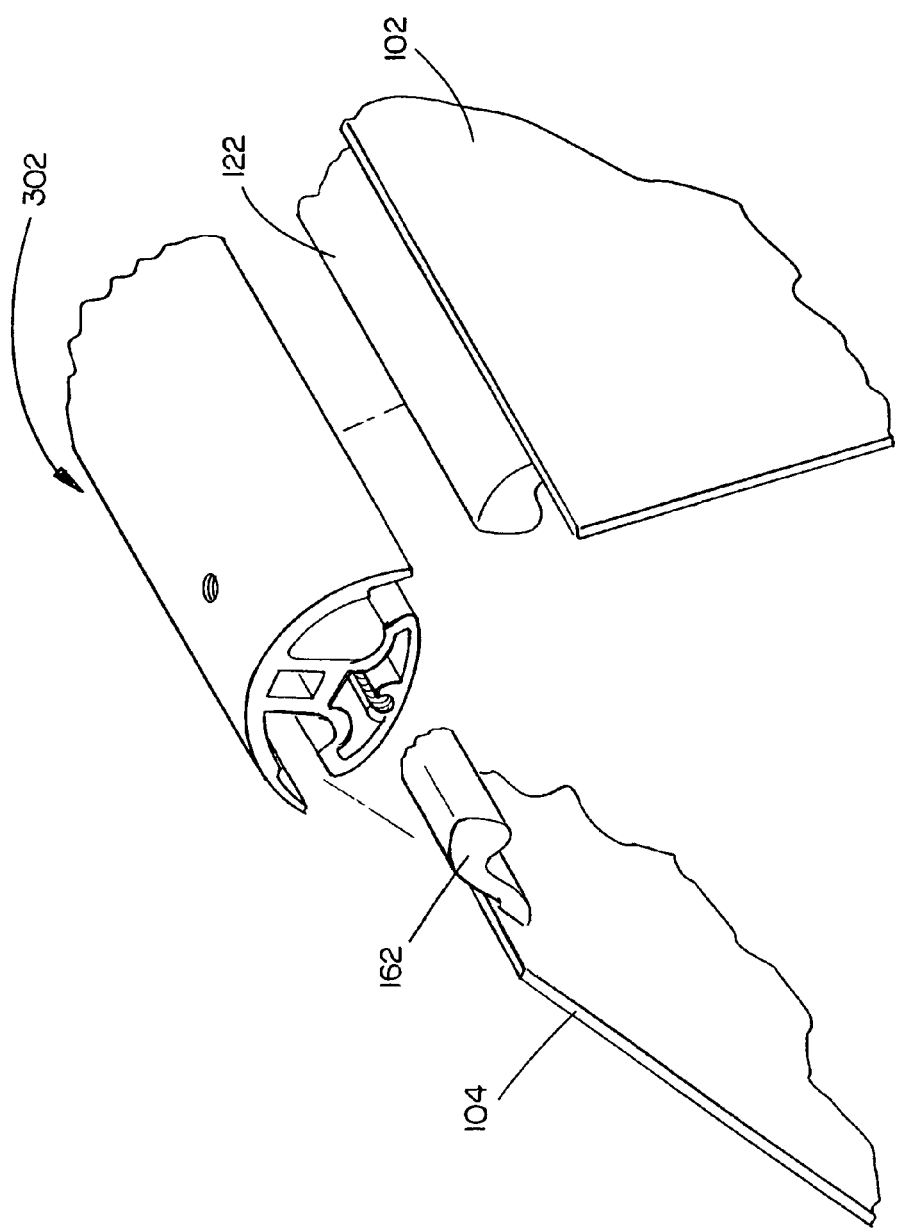
FIG. 8A is an expanded view illustrating the configuration of the first and second tongue members disposed on the first and second side panels and the operational engagement of the tongue members with the extruded tube assembly.
Figure 8B:
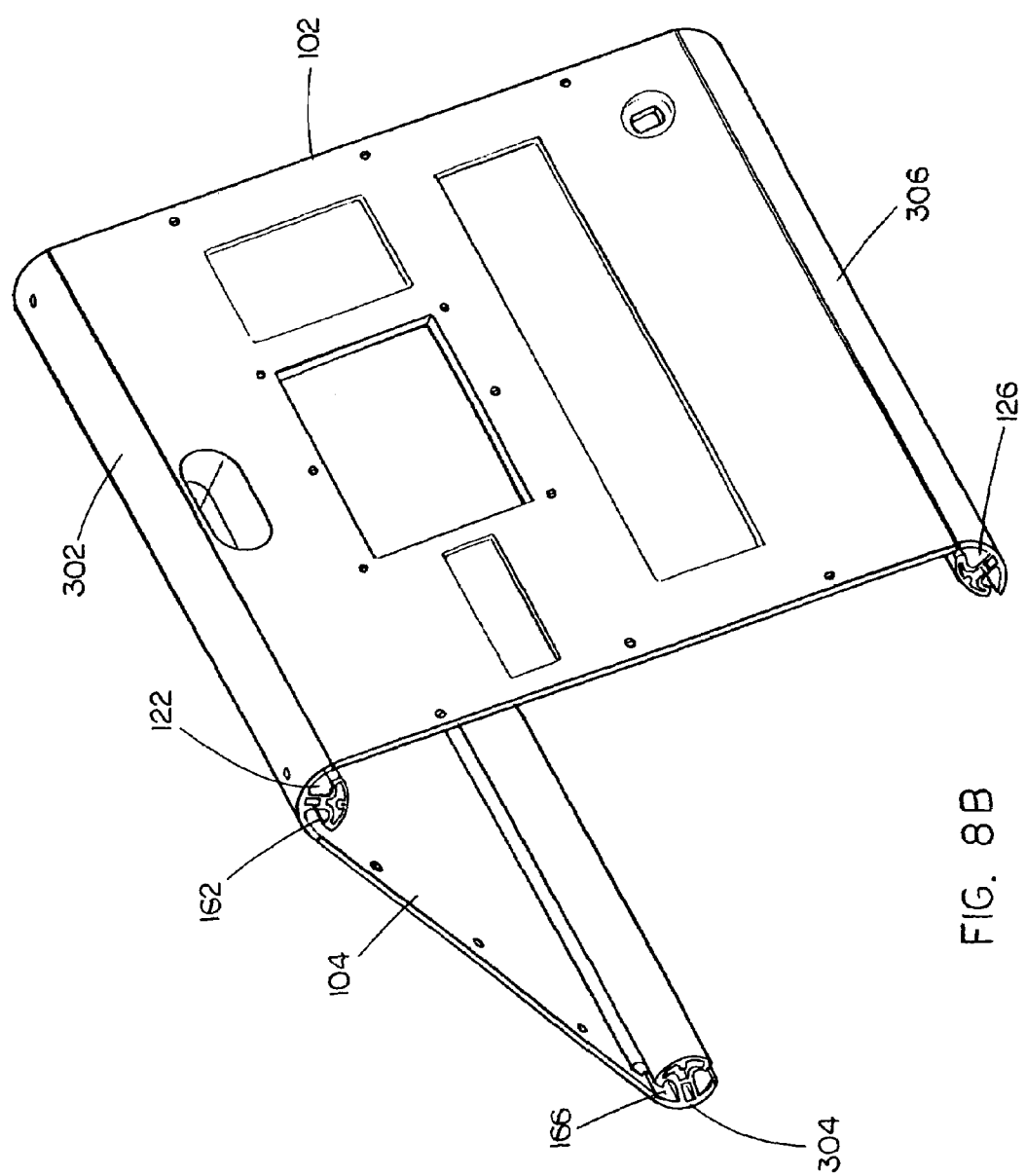
FIG. 8B is an isometric illustration of the first and second side panels coupled with a plurality of extruded tube assemblies.

In FIG. 6, the second side panel 104 includes a top edge 160 disposed with a first tongue member 162. A bottom edge 164 is disposed with a second tongue member 166. In the current embodiment, the first and second tongue member 162 and 166 extend substantially the entire length of the top and bottom edge 160 and 164, respectively. A second handle region 168 is disposed along the top edge 160. It is understood that the first handle region 128, of the first side panel 102, and the second handle region 168 are positioned such that when the air filtration unit 100 is assembled, the handles align to form a single continuous handle. Other configurations for providing a handle to the present invention as contemplated by those of ordinary skill in the art may be employed. A right side 170 and a left side 172, of the second side panel 104, are disposed with multiple fastening points 174, 176, 178, 180, 182, and 184, for engagement by a fastener, such as a bolt, screw, pin, and the like. Similar to the configuration described for the first side panel 102, the fasteners engage through the multiple fastening points on the second side panel 104 into multiple fastening points located on the first and second end panels.

As previously discussed, in reference to the first side panel 102, the right and left side 170 and 172 of the second side panel 104 may include tongue extension members or various other tool less assemblies for coupling with the first and second end panels.

Figure 9:
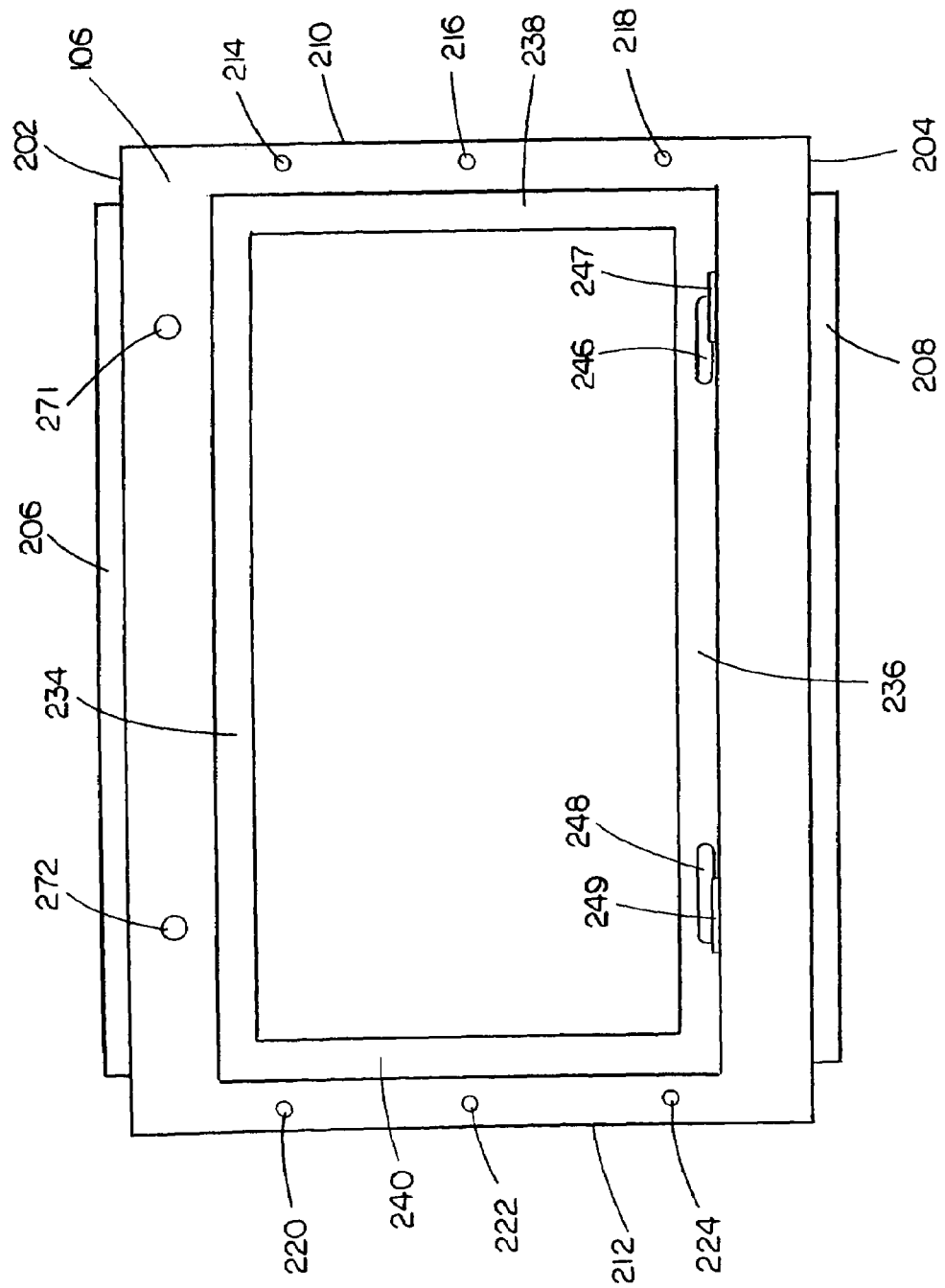
FIG. 9 illustrates a front view of a bottom panel of the air filtration unit of FIG. 1.
Figure 10:
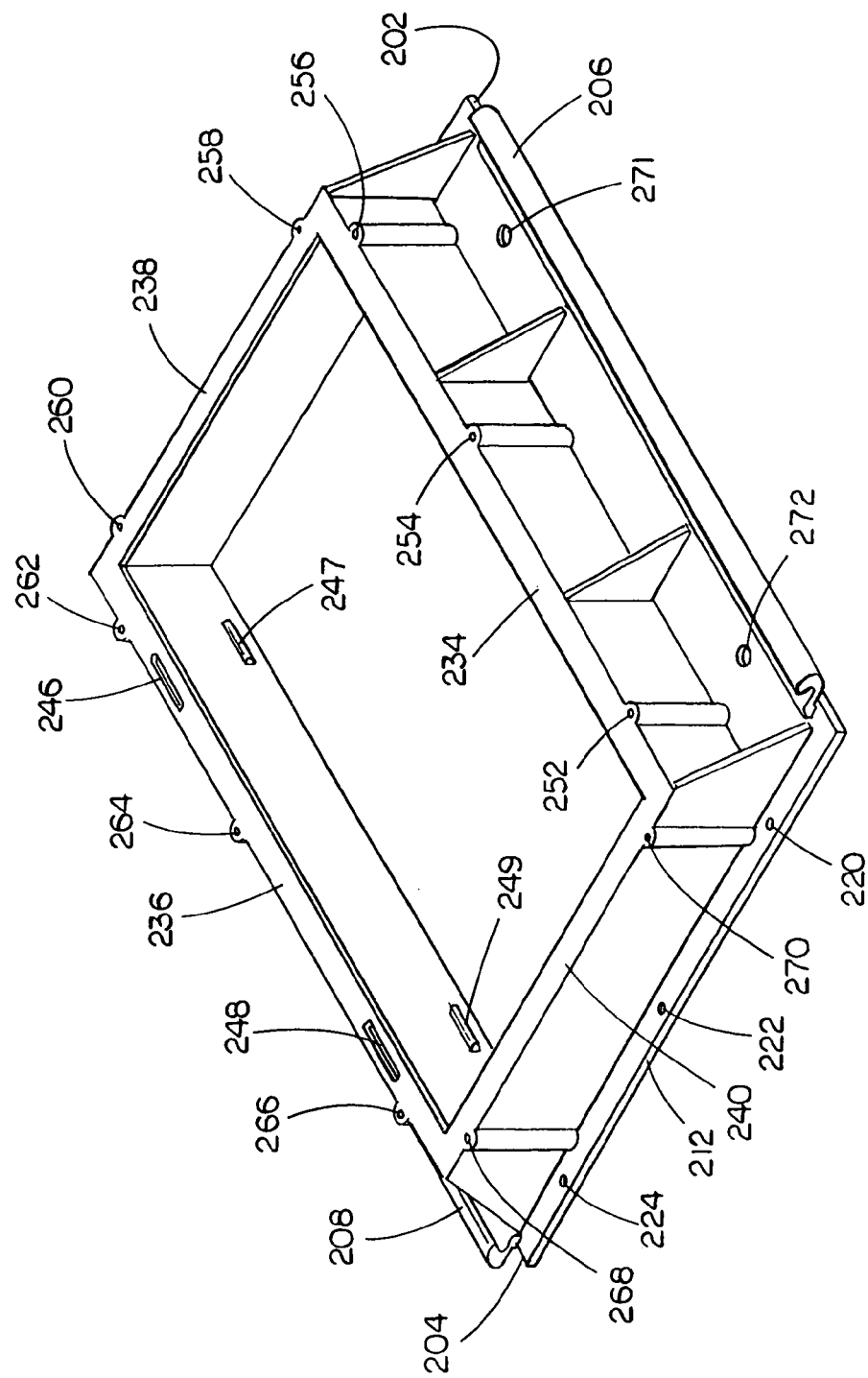
FIG. 10 is a back view illustration of the bottom panel of FIG. 9.
Figure 11:
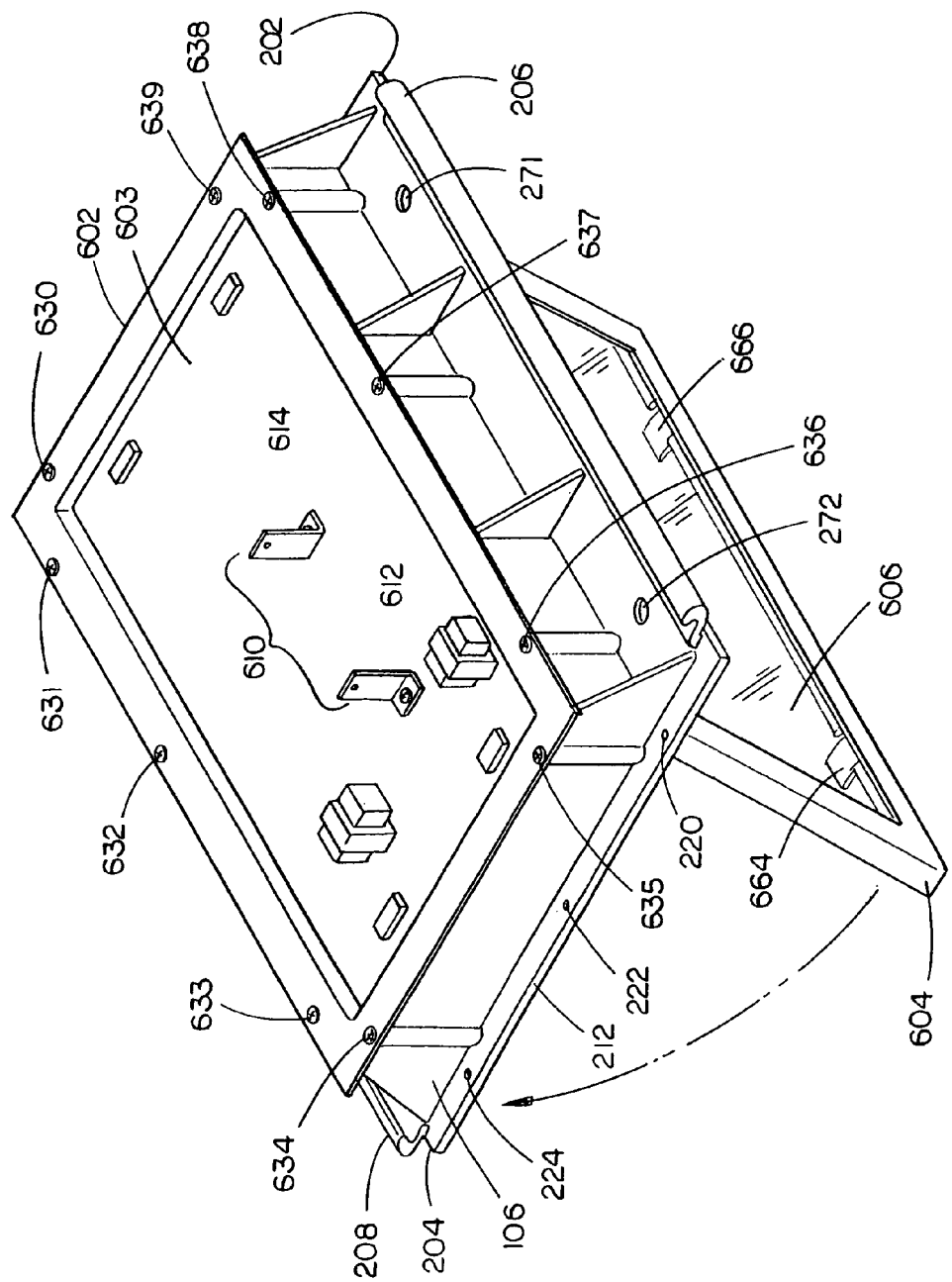
FIG. 11 illustrates a light assembly coupled with the bottom panel.
Figure 12:
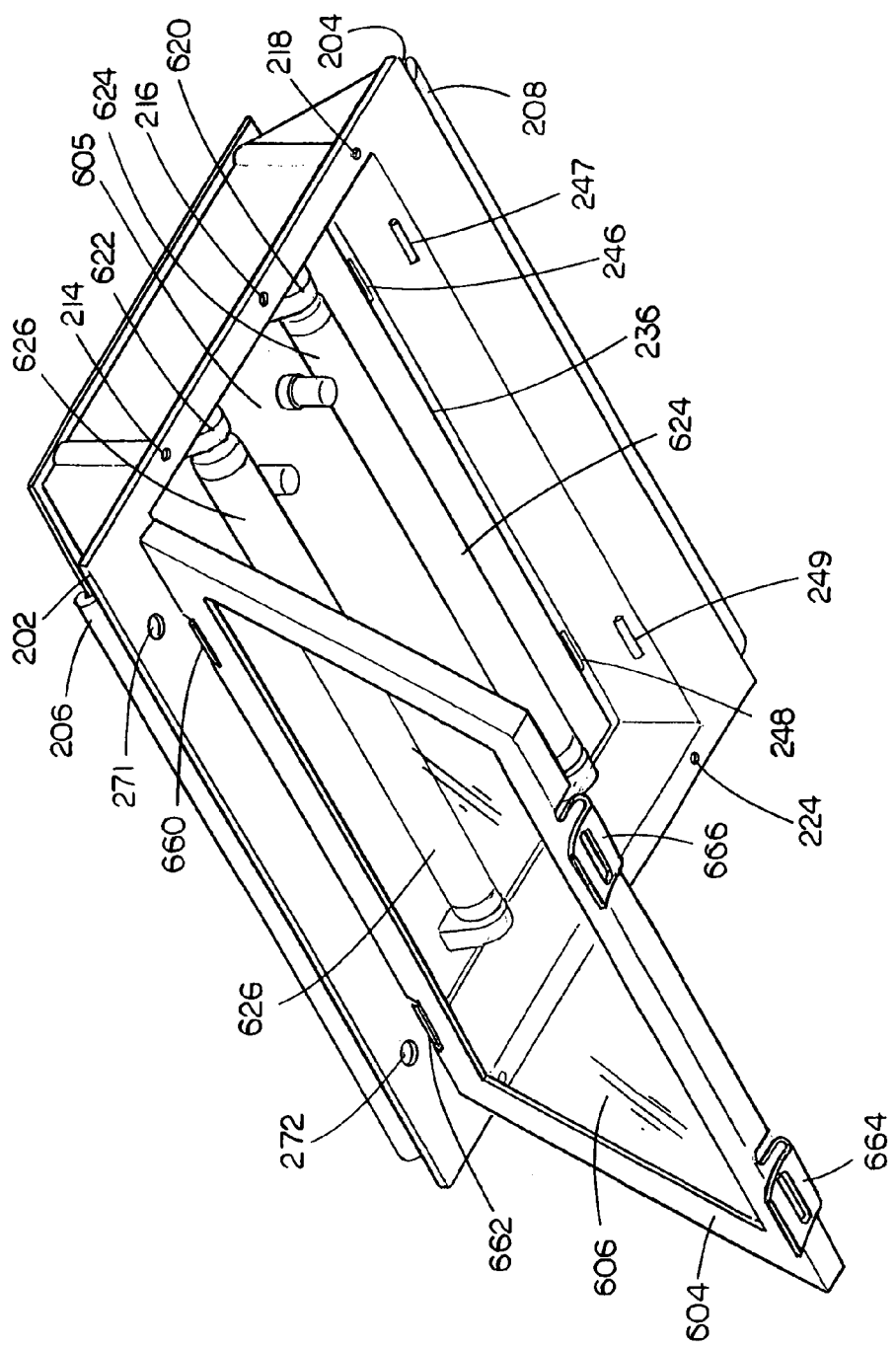
FIG. 12 illustrates the light assembly including a first and second lamp coupled with a lamp plate.
Figure 13:
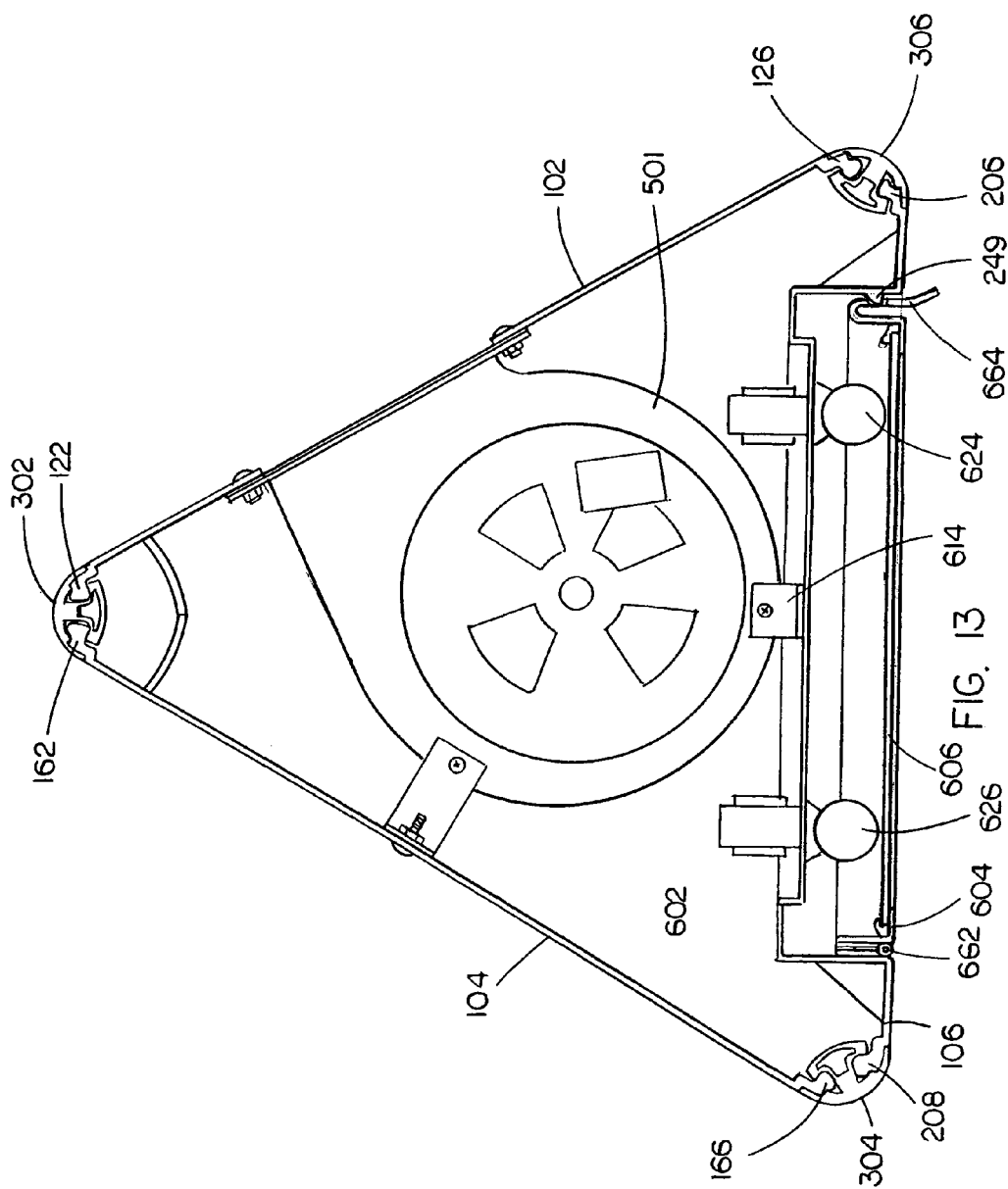
FIG. 13 is a side elevation view of the air filtration unit of the present invention with an end panel removed.
Figure 14:
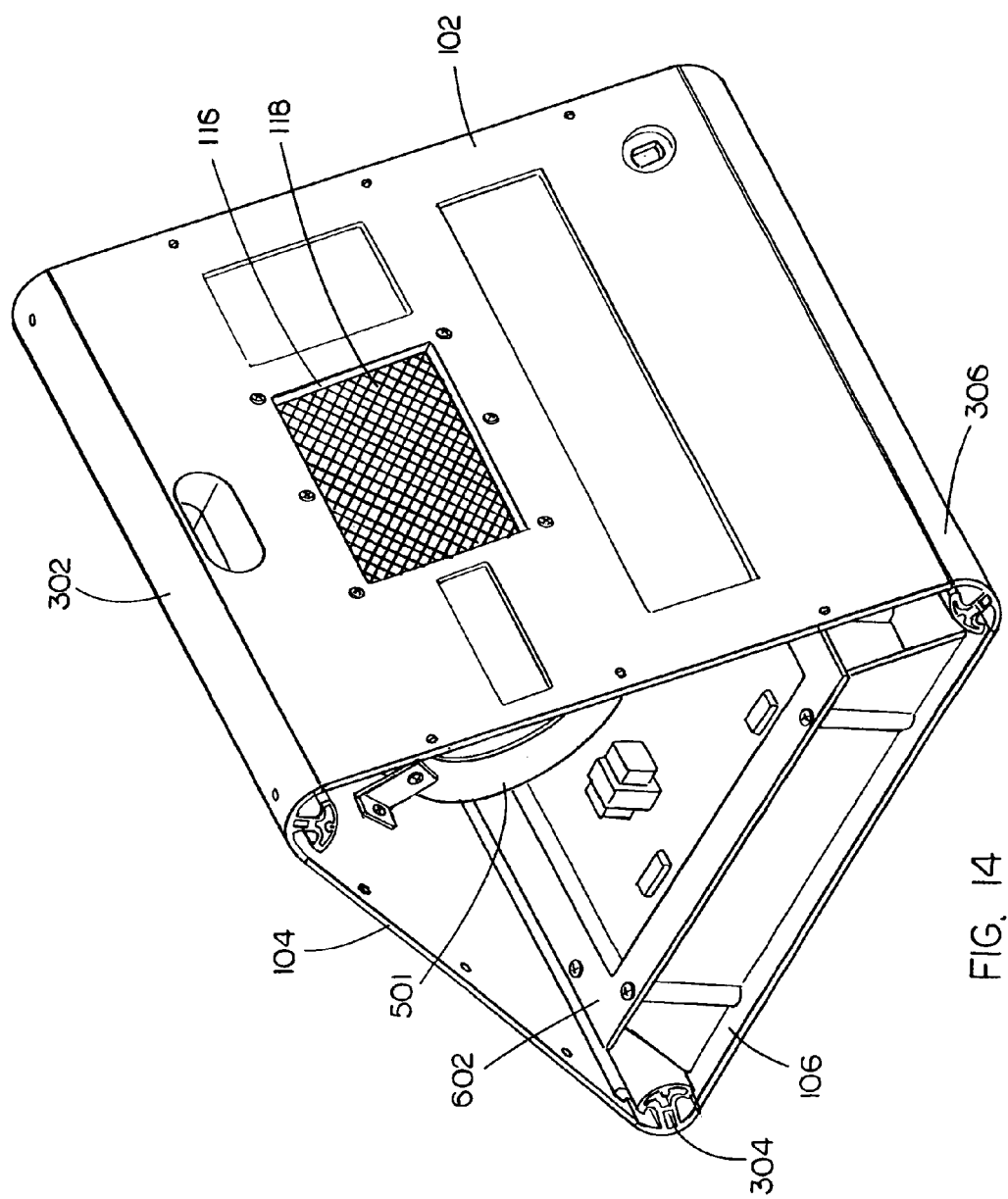
FIG. 14 is an isometric view of the air filtration unit with the end panel removed.

Referring now to FIGS. 9 and 10, the bottom panel 106 is shown. The bottom panel 106 includes a top edge 202 integrally disposed with a first tongue member 206 which extends substantially along the entire length of the top edge 202. A bottom edge 204 is integrally disposed with a second tongue member 208 which extends substantially along the entire length of the bottom edge 204. It is understood that the first and second tongue members may vary in length along the top and bottom edges, respectively. Further, the tongue members may be removable from the bottom panel 106. The first and second tongue member 206 and 208 provide for the coupling of the bottom panel 106 with the first and second side panels, as will be described below. A right side 210, of the bottom panel 106, includes multiple fastening points 214, 216, and 218. A left side 212, of the bottom panel 106, includes multiple fastening points 220, 222, and 224. The right side 210 and the left side 212 are disposed with multiple fastening points 214, 216, 218, 220, 222, and 224, for engagement by fasteners, such as a bolt, screw, pin, and the like. As will be shown and described below, the fasteners engage through the multiple fastening points into multiple fastening points located on the first and second end panels to couple the bottom panel 106 with the first and second end panels.

A recessed assembly is included within the bottom panel 106 including a recessed top edge 234, a recessed bottom edge 236, a recessed right side 238, and a recessed left side 240. The recessed bottom edge 236 is further disposed with a first recessed slotted receiver 246 and a second recessed slotted receiver 248. A first protruding member 247 is disposed along an inner wall 237, adjacent the recessed bottom edge 236, proximal to the first slotted receiver 246. A second protruding member 249 is disposed along the inner wall 237 proximal to the second slotted receiver 248. The recessed slotted receivers 246 and 248 and the protruding members 247 and 249 are utilized for coupling of a lighting assembly 600, which will be shown and described below.

A back side of the bottom panel 106, is shown in FIG. 10. Disposed upon the back side of the bottom panel 106 is a plurality of bottom panel lamp plate fastening points 252, 254, 256, 258, 260, 262, 264, 266, 268, and 270. On the back side of the recessed top edge 234 and the recessed bottom edge 236 is the plurality of bottom panel lamp plate fastening points 252, 254, and 256, and 262, 264, and 266, respectively. In addition, on the back side of the recessed right side 238 is disposed the plurality of bottom panel lamp plate fastening points 258 and 260 while on the back side of the recessed left side 212 is disposed the plurality of bottom panel lamp plate fastening points 268 and 270. These fastening points are utilized for the coupling of the lighting assembly 600 with the bottom panel 106, described below.

The bottom panel 106 further includes a first selector receiver 271 and a second selector receiver 272 disposed proximally to the top edge 202. The first and second selector receivers 271 and 272 enable a first and second selector assembly, which in the current embodiment is a first pull chain 680 and a second pull chain 682, to access the blower 501 and the light assembly 600. It is contemplated that the air filtration unit 100 may be enabled with only one selector receiver or three or more selector receivers. The first and second selector receivers enable the first and second pull chain 680 and 682 to provide a user with the ability to determine the functionality of the air filtration unit 100. For example, the first pull chain 680 may be coupled with the blower 501 and enable the blower 501 in either an on or off state. The second pull chain 682 may be coupled with the light assembly 600 and enable the light assembly in either an on or off state. It is understood that the first and second selector receivers may be enabled to allow for user control over the blower 501 and light assembly 600 in various manners. For instance, the first selector assembly may enable various assemblies, such as a two-position switch, toggle switch, and the like.

It is contemplated that a single selector receiver may provide for the control of both the blower 501 and the lighting assembly 600, through enabling of a single selector assembly. The location of the one or more selector receivers may vary as contemplated by those of ordinary skill in the art.

Figure 15A:
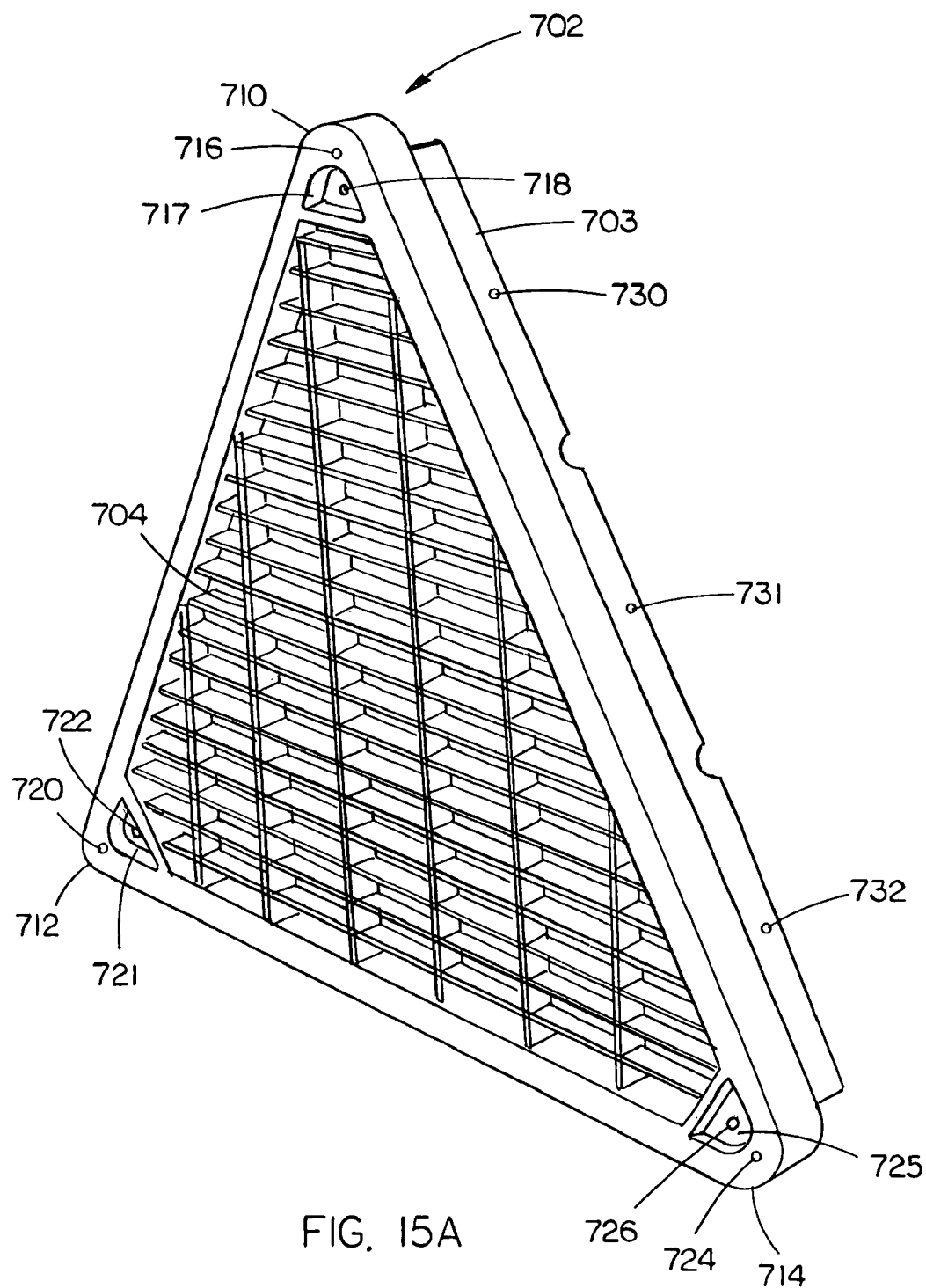
FIGS. 15A and 15B illustrate a front and back view of a triangular end panel exemplary of a first and second end panel used in accordance with the air filtration unit of FIG. 1, of the present invention.
Figure 15B:
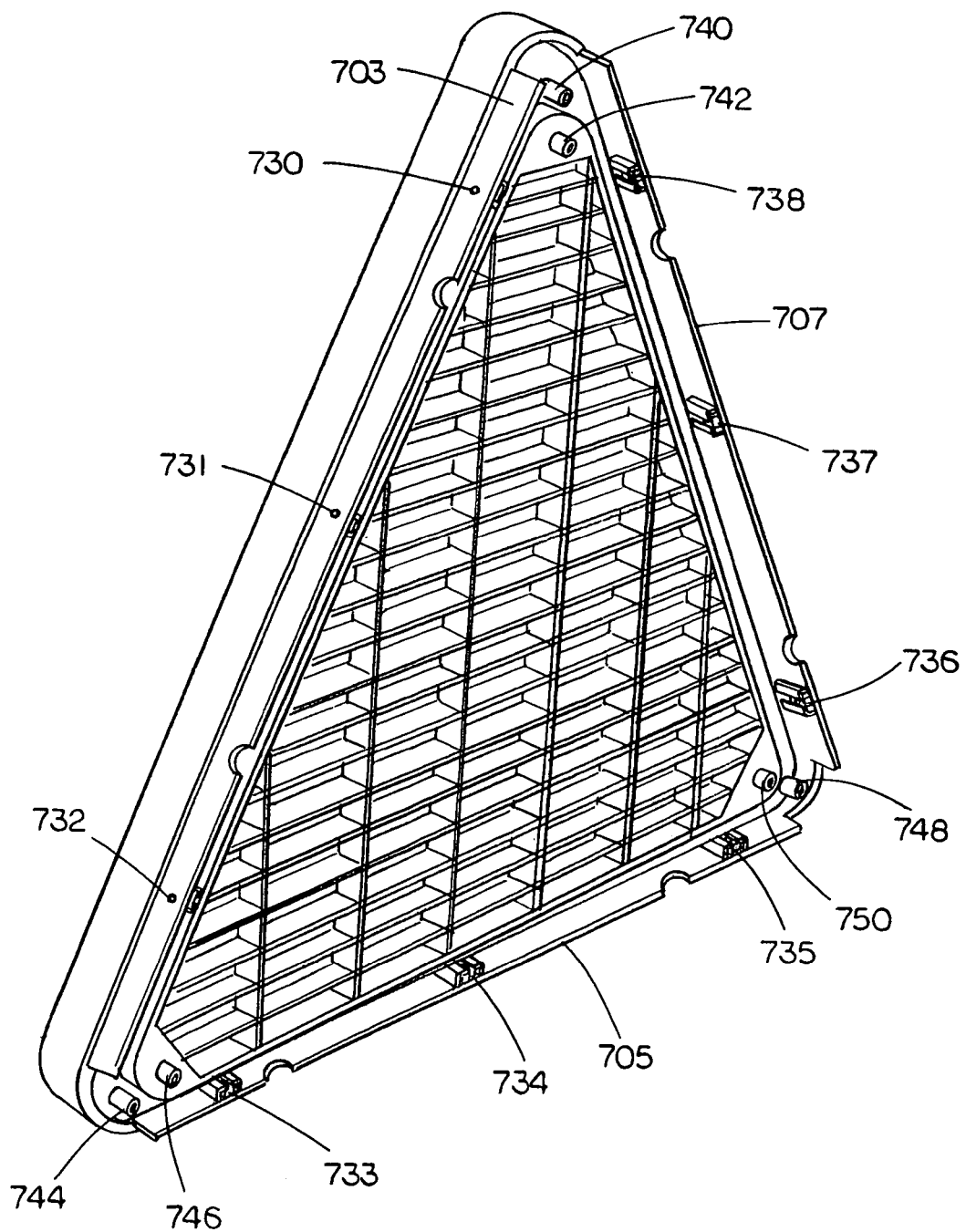
Figure 16:
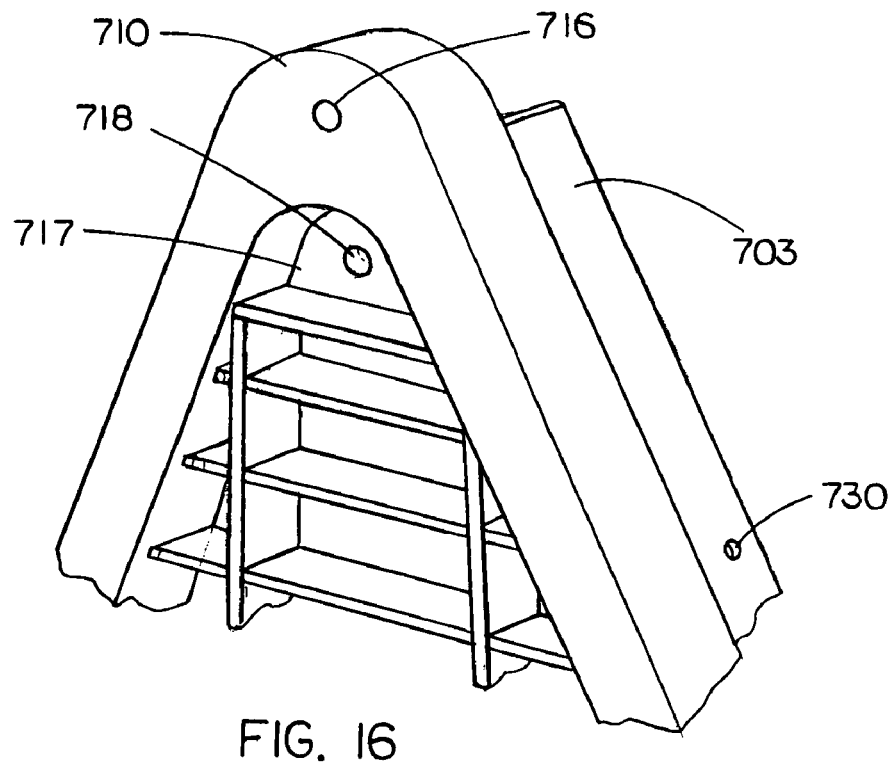
FIG. 16 is an expanded front view of a first corner of the end panel of FIGS. 15A and 15B.

The first end panel 702, shown in FIGS. 15A and 15B, is similar in every respect to the second end panel 706. The first inlet gate 704, disposed on the first end panel 702, is similar in every respect to the second inlet gate 708, disposed on the second end panel 706. The first end panel 702 has a first corner 710, a second corner 712, and a third corner 714. Disposed upon the first corner 710 is a pair of fastening points 716 and 718, upon the second corner 712 are fastening points 720 and 722, and upon the third corner 714 are fastening points 724 and 726.

On the interior of the first end panel 702 is a first rim 703, a second rim 705, and a third rim 707, which include a plurality of fastening points for the coupling of the first end panel 702 with the first side panel 102, second side panel 104, and the bottom panel 106. In the current embodiment, on the first rim 703 of the first end panel 702 is disposed a plurality of fastening points 730, 731, and 732. On the second rim 705 a plurality of fastening points 733, 734, and 735, are disposed. On the third rim 707 a plurality of fastening points 736, 737, and 738, are disposed. The plurality of fastening points 730 through 738 include a threaded member for receiving a fastener such as a screw, bolt, and the like. In the preferred embodiment, the threaded member is a threaded nut, which is secured in alignment with a through point of the fastening points. Various assemblies may be employed to secure a fastener with the end panels as may be contemplated by those of ordinary skill in the art.

Figure 17:
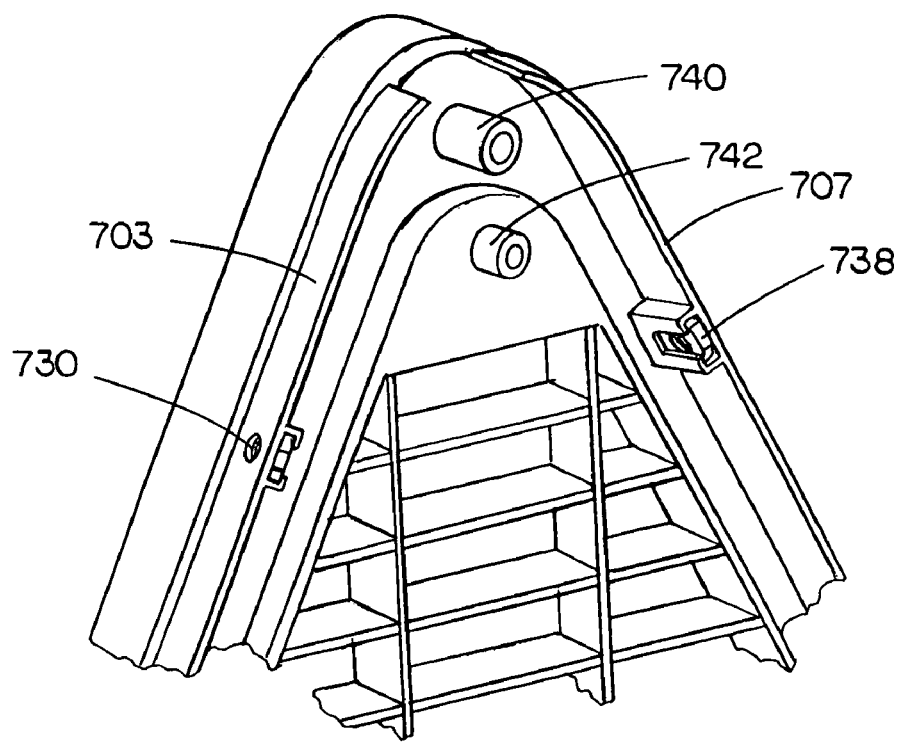
FIG. 17 is an expanded back view of the first corner of the end panel of FIGS. 15A and 15B.
Figure 20:
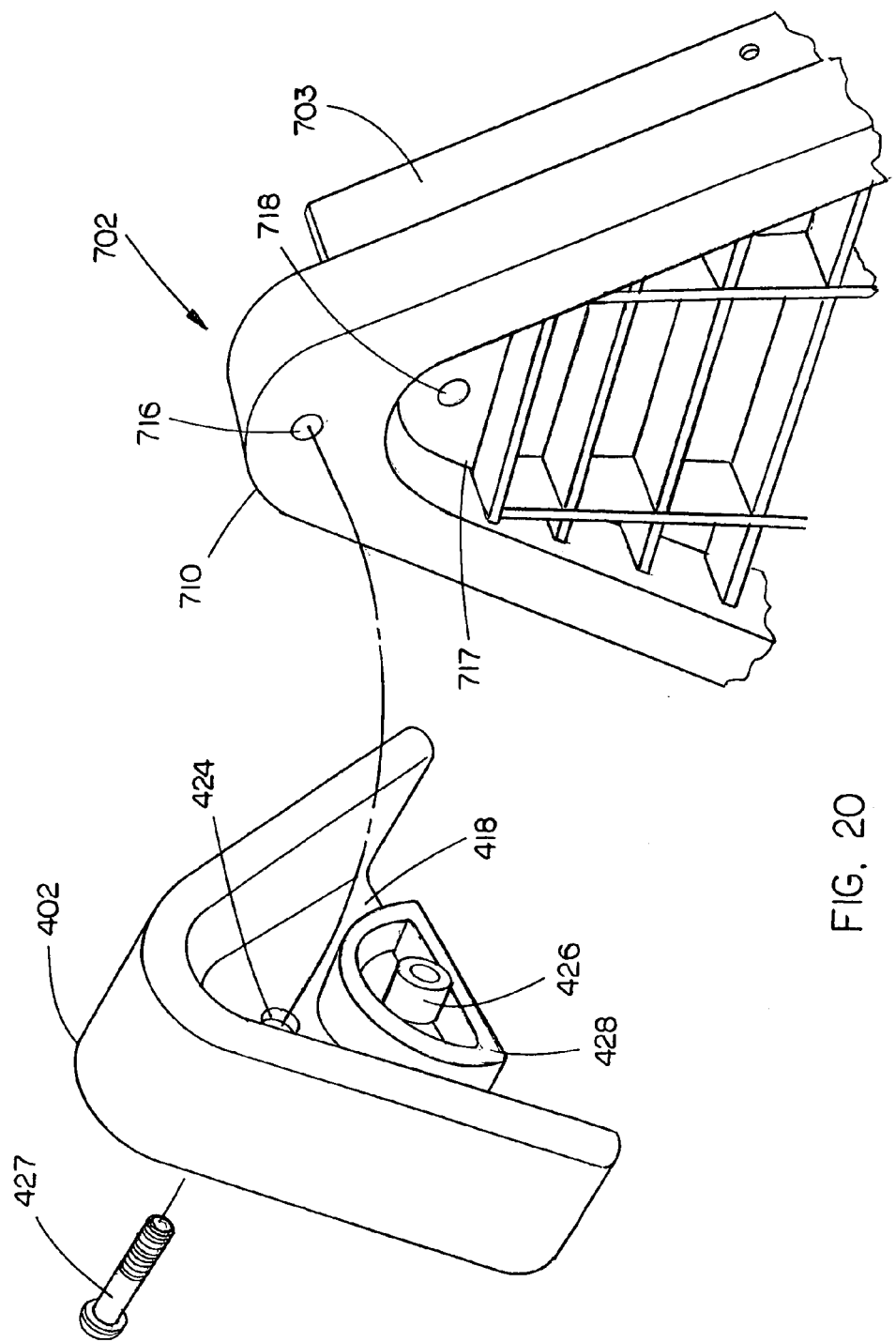
FIG. 20 illustrates the coupling of the corner cap with the corner of the end panel.

In the preferred embodiment, the fastening points 716, 720, and 724 of the first end panel 702 extend from the exterior of the first end panel 702 into a corner first protracted member 740, 744, 748, on the interior of the first end panel 702. The corner first protracted members are preferably configured as hollow tubes which extend from the interior side of the first end panel 702. It is contemplated that the first protracted members may be variously configured as contemplated by those of ordinary skill in the art. Further, on the first end panel 702 the fastening points 718, 722, and 726, extend from a recessed area 717, 721, and 725 into a corner second protracted member 742, 746, and 750, respectively, on the interior of the first end panel 702. The corner second protracted members are preferably configured in accordance with the shape of the first end panel 702 having a protruding member for engaging with and securing the position of a first and second filter assembly as will be shown and described below. As shown in FIGS. 15B and 17, the corner second protracted members are configured generally in a triangular shape which is in accordance with the configuration of the first end panel 702. It is contemplated that the second protracted members may be variously configured as contemplated by those of ordinary skill in the art. For example, in the current embodiment the protruding members are removable from the corner second protracted members. Alternatively, the protruding members may be an integral part of the corner second protracted members.

The recessed areas 717, 721, and 725, and the fastening points 716, 718, 720, 722, 724, and 726, disposed on the exterior of each corner of the first end panel 702 enables coupling with a plurality of corner caps. In the preferred embodiment, the air filtration unit 100 includes a first corner cap 402, a second corner cap 404, a third corner cap 406, a fourth corner cap 408, a fifth corner cap 410, and a sixth corner cap 412. In the exemplary illustrations, the first corner cap 402 is shown, and is representative of the corner caps 404 through 412.

The first corner cap 402 includes as housing 414 which is generally shaped in a configuration suitable for operational engagement with one of the plurality of corners established by the first end panel or the second end panel. The housing 414 includes a first side 416 and a second side 417. The second side 417 defines a recessed area 418 which extends from a first interior wall 419 to the second side 417. In the preferred embodiment, the recessed area 418 is generally similarly configured with the shape of the housing 414. It is understood that the recessed area 418 may be configured in various manners as contemplated by those of ordinary skill in the relevant art.

The housing 414, further defines a first fastening point. The first fastening point includes a first side first fastening point 420 and extends from the first side 416, through the housing 414, forming an interior fastening point 424 on the first interior wall 419. In the preferred embodiment, the first fastening point defines a threaded aperture which a fastener, such as a bolt, screw, and the like, may engage through. The housing 414 further includes a second fastening point. The second fastening point includes a first side second fastening point 422 and extends from the first side 416, through the housing 414, forming a protruding interior fastening point 426. The protruding interior fastening point 426, in the preferred embodiment, couples with and extends from the first interior wall 419.

It may be seen in the current embodiment, that a first protruding end panel adapter 428 is coupled with and extends from the first interior wall 419. The first protruding end panel adapter 428 is configured to enable its insertion within the recessed area 717 of the first corner 710. It is contemplated that the first protruding end panel adapter may be variously configured to accommodate its insertion within variously configured recessed areas of the corners of the end panels. It is further contemplated that the first and second fastening points may enable the use of various fasteners, such as clips, pins, and the like without departing from the scope and spirit of the present invention.

The corner caps couple with the corners of the first and second end panels. For example, the corner cap 402 may couple with the corner 710 of the first end panel 702. The recessed area 717, of the corner 710, accepts the protracted member 428, of the corner cap 402. This may be accomplished through a sliding engagement of the corner cap 402 onto the corner 710. Thus, the second fastening point, of the corner cap 402, is aligned with the fastening point 718, of the corner 710. Further, the corner 710 is accepted into the recessed area 418 of the corner cap 402. This may also be accomplished through the sliding engagement of the corner cap 402 onto the corner 710. This further aligns the first fastening point, of the corner cap 402, with the fastening point 716, of the corner 710. With the corner cap 402 so engaged with the corner 710 a fastener 427 and 429, such as a bolt, screw, and the like, may be engaged through the first and/or second fastening points of the corner cap 402 into the fastening points 716 and/or 718 of the corner 710 of the first end panel 702. Thus, the corner cap 402 may be secured to the first end panel 702.

Figure 2:
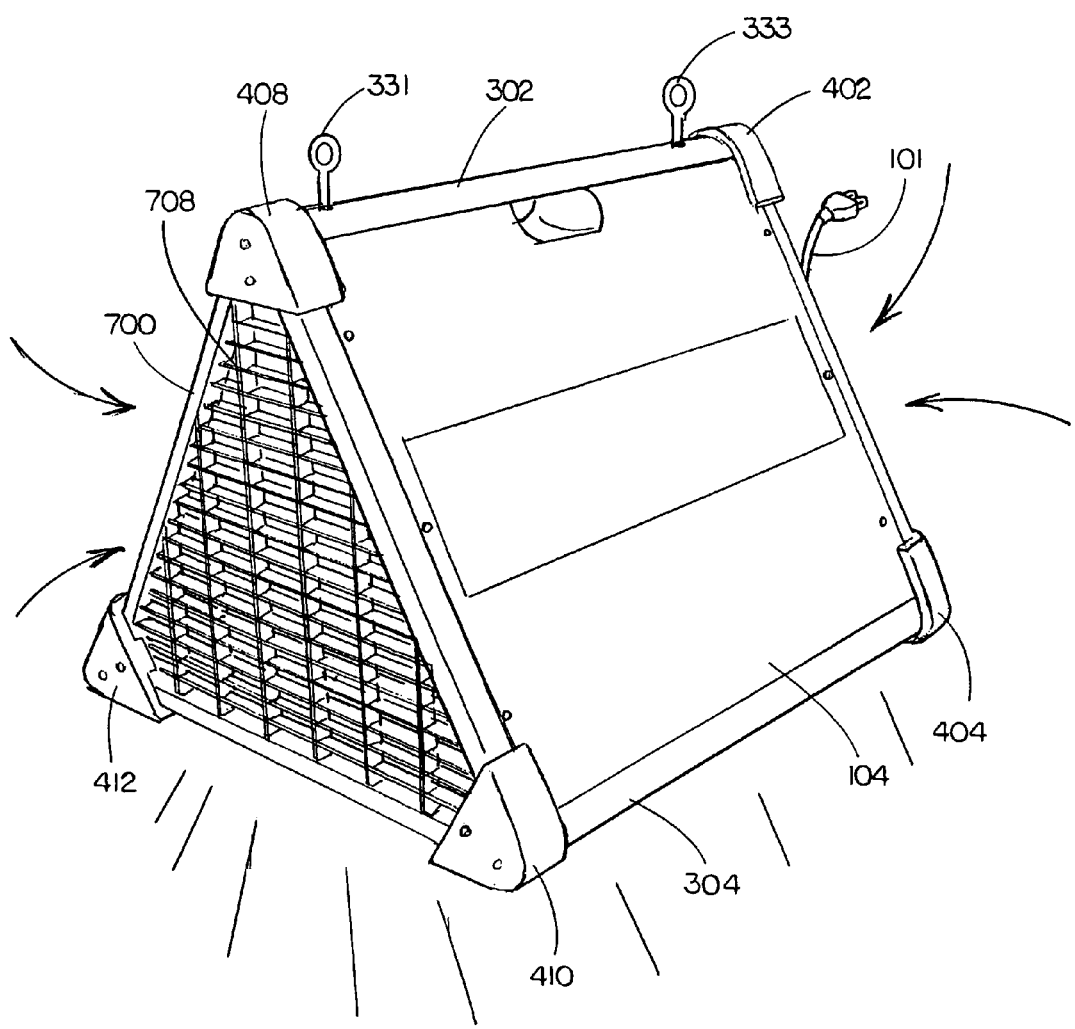
FIG. 2 is the air filtration unit of FIG. 1 illustrating a second side panel and mounting members.

The air filtration unit 100 further includes a plurality of extruded tube assemblies 302, 304, and 306. In the preferred embodiment, each of the extruded tube assemblies is similar in design, therefore description of a first extruded tube assembly 302 is understood to encompass the design of the other extruded tube assemblies 304 and 306. FIGS. 7A and 7B illustrate the extruded tube assembly 302. The extruded tube assembly 302 includes a hood wrap 310 which generally extends the length of the first, second, and bottom panels. The hood wrap 310 is generally configured in an arc shape having a first side 311 and a second side 312. Further, the hood wrap 310 has a first end 313 and a second end 314. In the preferred embodiment, disposed upon the first side 311 of the hood wrap 302 is a first mounting receiver 330 and a second mounting receiver 332. The first and second mounting receivers may be engaged by a first mounting member 331 and a second mounting member 333, as shown in FIG. 2. It is contemplated that the first and second mounting receivers may couple various mounting assemblies to the air filtration unit 100. In the exemplary embodiment, the first and second mounting receivers are threaded bores which may couple with a threaded fastener, such as the threaded shafts of the eye hooks shown in FIG. 2. The shafts may include a secondary mounting member coupled at the opposite end of the coupling with the hood wrap and enable the air filtration unit 100 to be mounted to a surface, such as a ceiling.

In the preferred embodiment, the hood wrap 302 is disposed with coupling assembly 315. The coupling assembly, in the preferred embodiment, is a single piece assembly including a mounting member 316 which is coupled with the second side 312 of the hood wrap 310. It is contemplated that the mounting member 316 may be integrally or removably coupled with the second side 312, of the hood wrap 310. The mounting member 316 substantially extends the length of the second side 312 of the hood wrap 310 and may be variously configured as contemplated by one of ordinary skill. In the preferred embodiment, the mounting member 316 is configured in a generally elongate square shape. The mounting member 316 is further coupled with a first arm 317 and a second arm 318. In the preferred embodiment, the first and second arms are integrally coupled with the mounting member 316. In alternative embodiments the first and second arms 317 and 318 may be removable from the mounting member 316.

In the preferred embodiment, the first and second arms integrally coupled with the mounting member 316 form a substantially "T" shaped coupling assembly. The first and second arms extend the length of the mounting member 316 and extend, generally perpendicular, to the mounting member 316. It is contemplated that the first and second arms may be variously configured providing first and second arms extending from the mounting member 316 in various configurations, such as at a forty-five degree angle relative to the mounting member 316. Other configurations as contemplated by those of ordinary skill in the relevant art may be employed.

The first and second arms extend from the mounting member 316 generally toward the second side 312 of the hood wrap 310. Thus, the mounting member 316 and the first and second arms define a first groove 322 and a second groove 324, relative to the second side 312 of the hood wraps 310. It is understood that the first and second arms provide for the operational engagement and coupling between the extruded tube assemblies and the tongue members of the first, second, and bottom panels. The operational engagement being defined by the groove having at least a part of the tongue member inserted within. The coupling being defined by the physical engagement of at least a part of the tongue member with the first arm 317, second arm 318, and the mounting member 316. It is contemplated that the configuration of the groove may be varied by enabling hood wraps and coupling assemblies in various configurations.

The coupling assembly 315 includes a first end 319, which further includes a first fastening point 320. It is understood that the coupling assembly 315 further includes a second end including a second fastening point which may be similar in all respects to the first fastening point. Further, the fastening point 320, herein described, may be exemplary of fastening points disposed upon each extruded tube assembly 302, 304, and 306. The first fastening point 320 is generally configured as a threaded bore for coupling with a threaded shaft, such as a bolt, screw, and the like. In the preferred embodiment, the first fastening point 320 is integrally coupled with the first and second arm 317 and 318. The location of the first fastening point 320 may be varied as contemplated by those of ordinary skill. Still further, the first fastening point 320 may be removable from the first and second arms and couple with various other features of the coupling assembly 315. In operation, the first and second ends of the coupling assembly 315 may couple with the corners of the first and second end panels to effectuate the coupling of the extruded tube assembly 302 with the first and second end panel 108 and 110. It may also be seen that the fastening point 320 is utilized to assist in the coupling of the first and second filter systems to the first and second end panels.

In the exemplary embodiment described previously, the corners of the first and second end panels are coupled with corner caps by use of fasteners engaging through the first and second fastening points of the corner caps and into the fastening points disposed on the corners of the first and second end panels. It is further the case, that the fasteners may extend through the fastening points of the corners of the first and second end panels to engage with the first and second fastening points of the coupling assemblies of the extruded tube assemblies. Thus, each corner of the first and second end panels of the air filtration unit 100 may couple with a corner cap and an extruded tube assembly.

It is understood that the extruded tube assemblies may be variously configured. For example, the extruded tube assemblies may be extruded tube assemblies which provide generally rounded finished edges to the air filtration unit. Alternatively, the extruded tube assemblies may be formed of multiple parts which may be coupled together to form a desired configuration. For example, the hood wrap may be a two or three piece assembly coupled together by fasteners. The mounting member may be removed and the coupling assembly integrally mounted with or removably coupled with the multiple piece assembly of the hood wrap.

Figure 3:
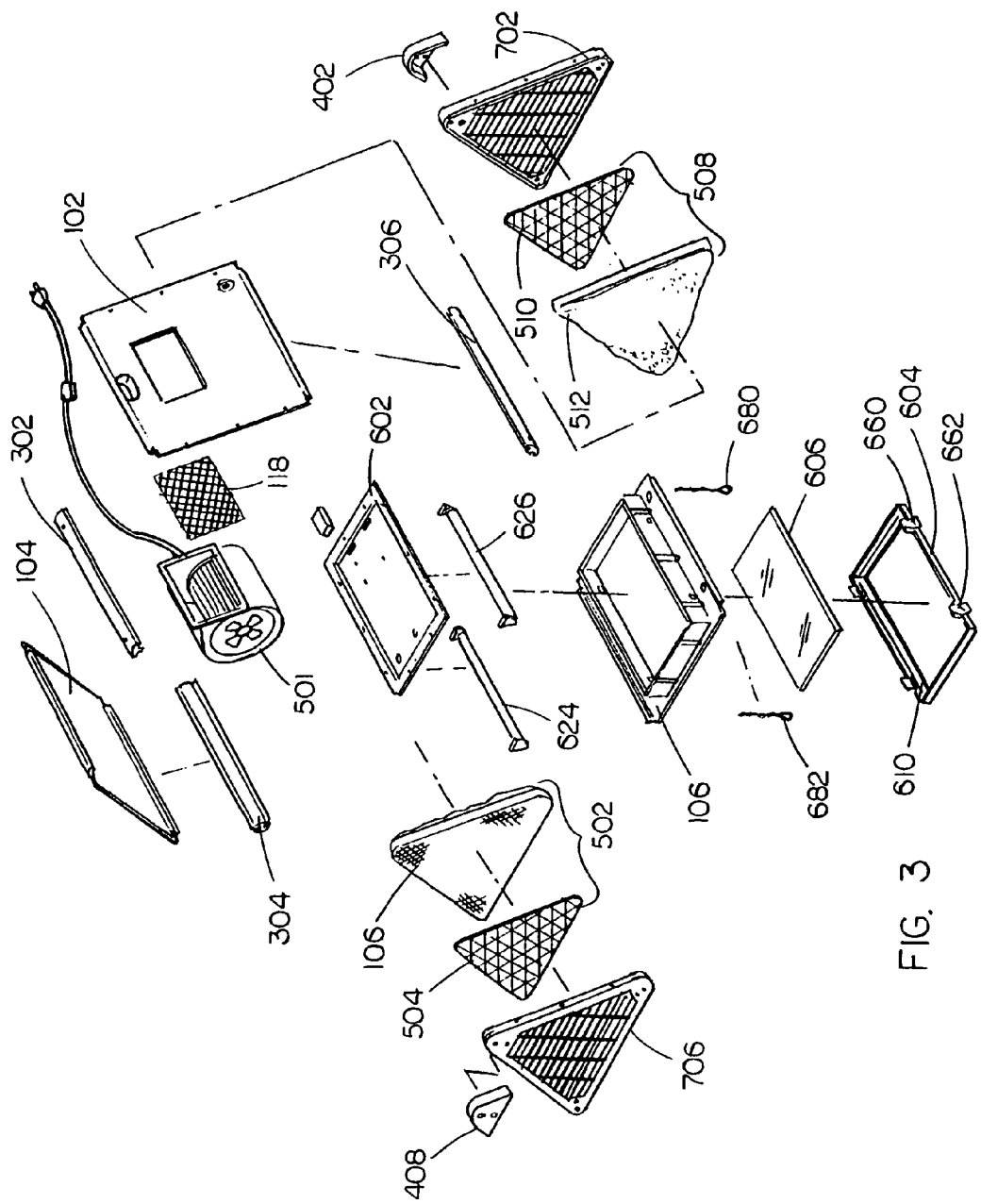
FIG. 3 is an exploded view of the air filtration unit of FIG. 1.
Figure 4:
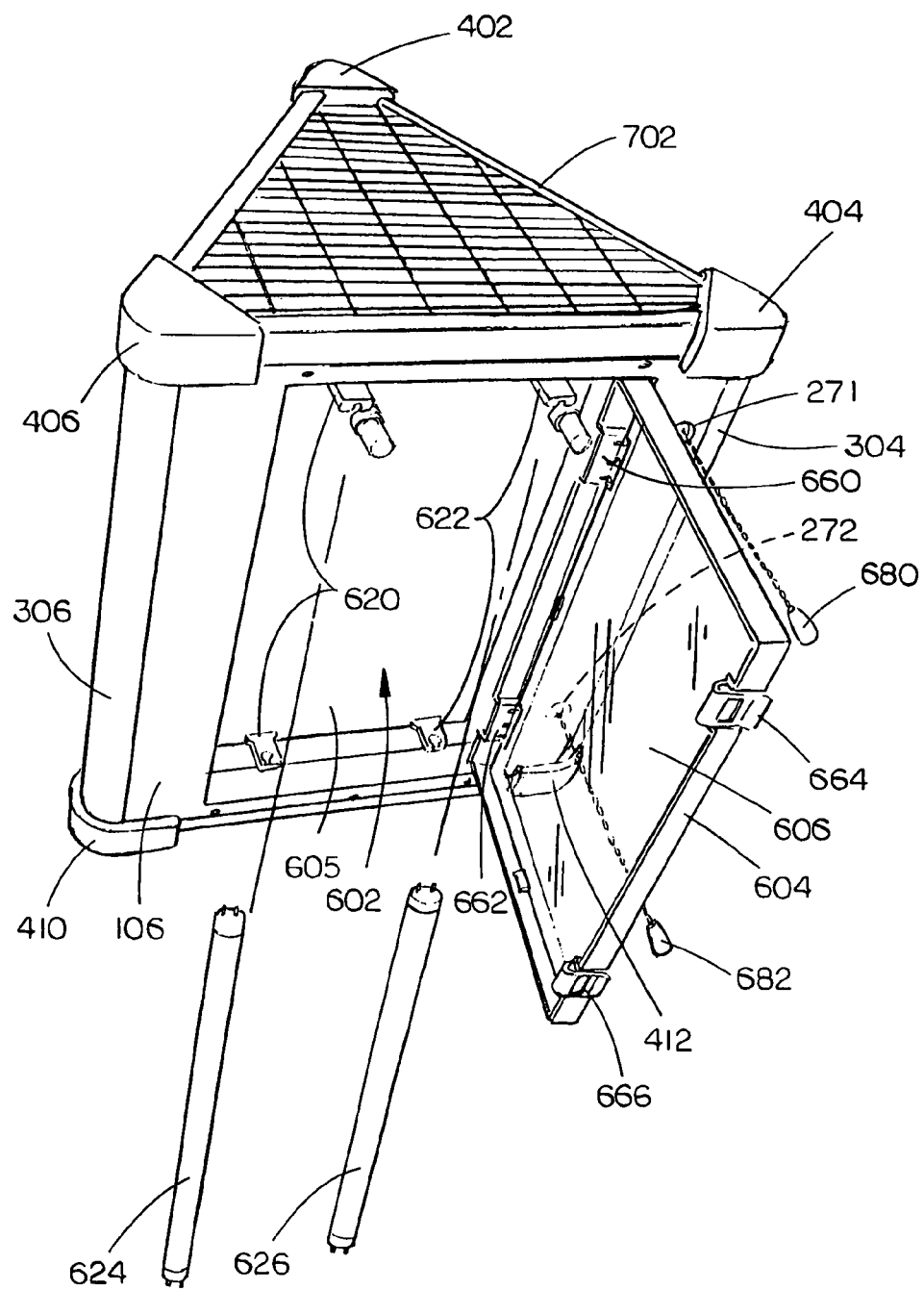
FIG. 4 is a bottom plan view illustrating a bottom panel including a light assembly in accordance with an exemplary embodiment of the present invention.
Figure 21:
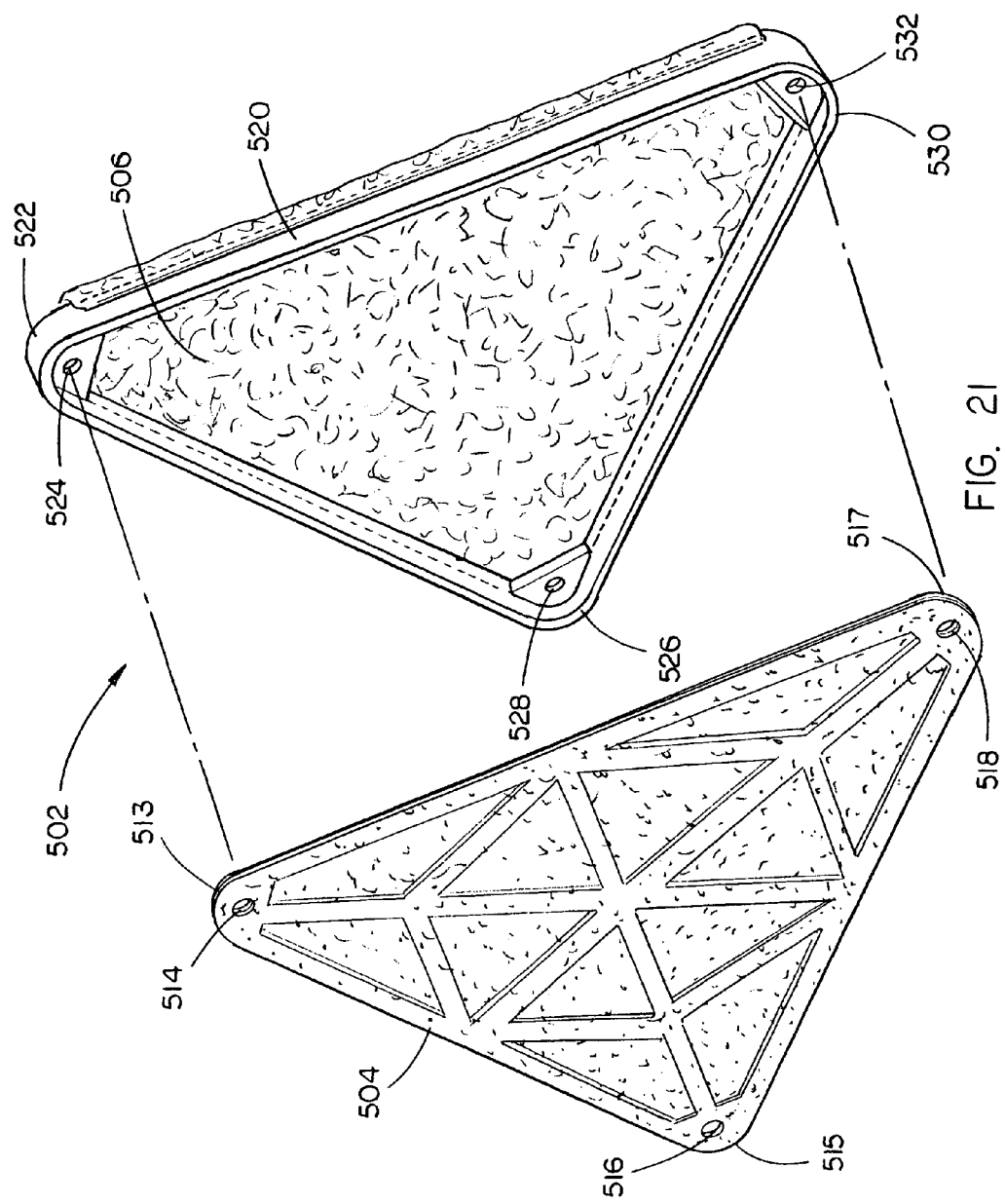
FIG. 21 is an exploded view of a first filter assembly of the air filtration system in accordance with an exemplary embodiment of the present invention.
Figure 22:
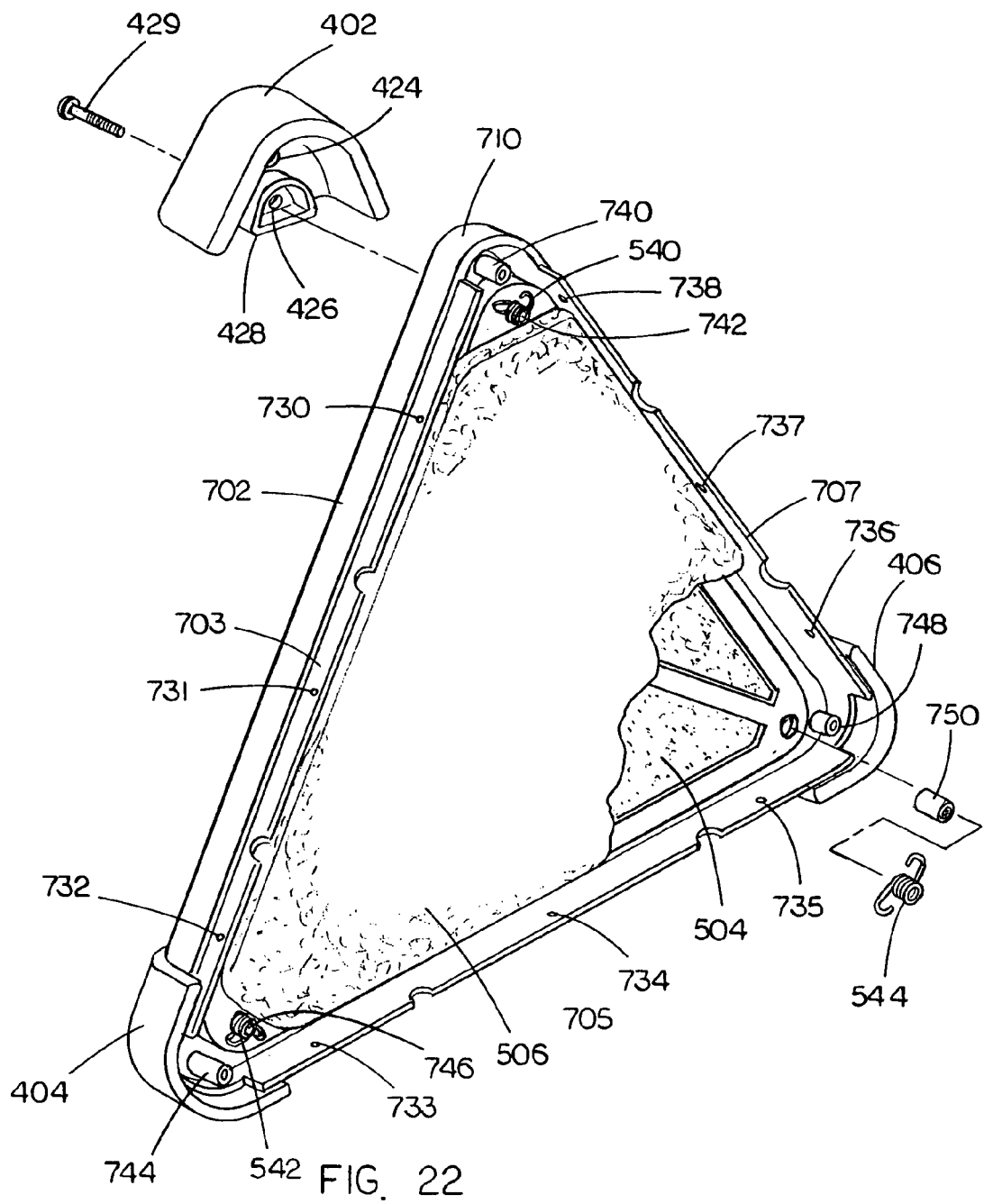
FIG. 22 is a front perspective view illustrating the first end panel engaged, at each of its three corners, by the corner cap and being engaged by the first filter assembly.
Figure 23:
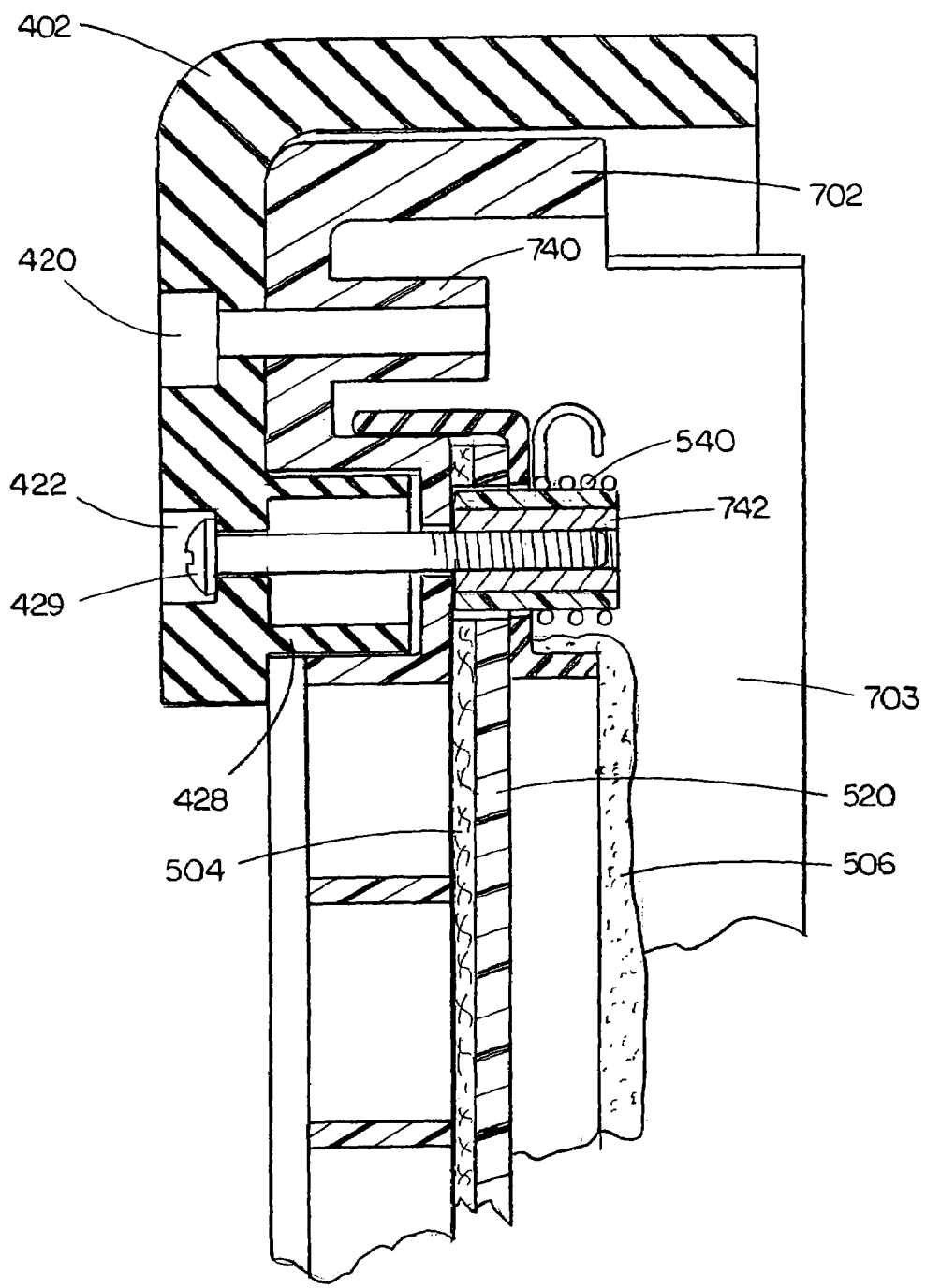
FIG. 23 is an expanded cross-sectional view illustrating the corner cap coupled with the end panel and the first filter assembly coupled with the end panel.
Figure 24:
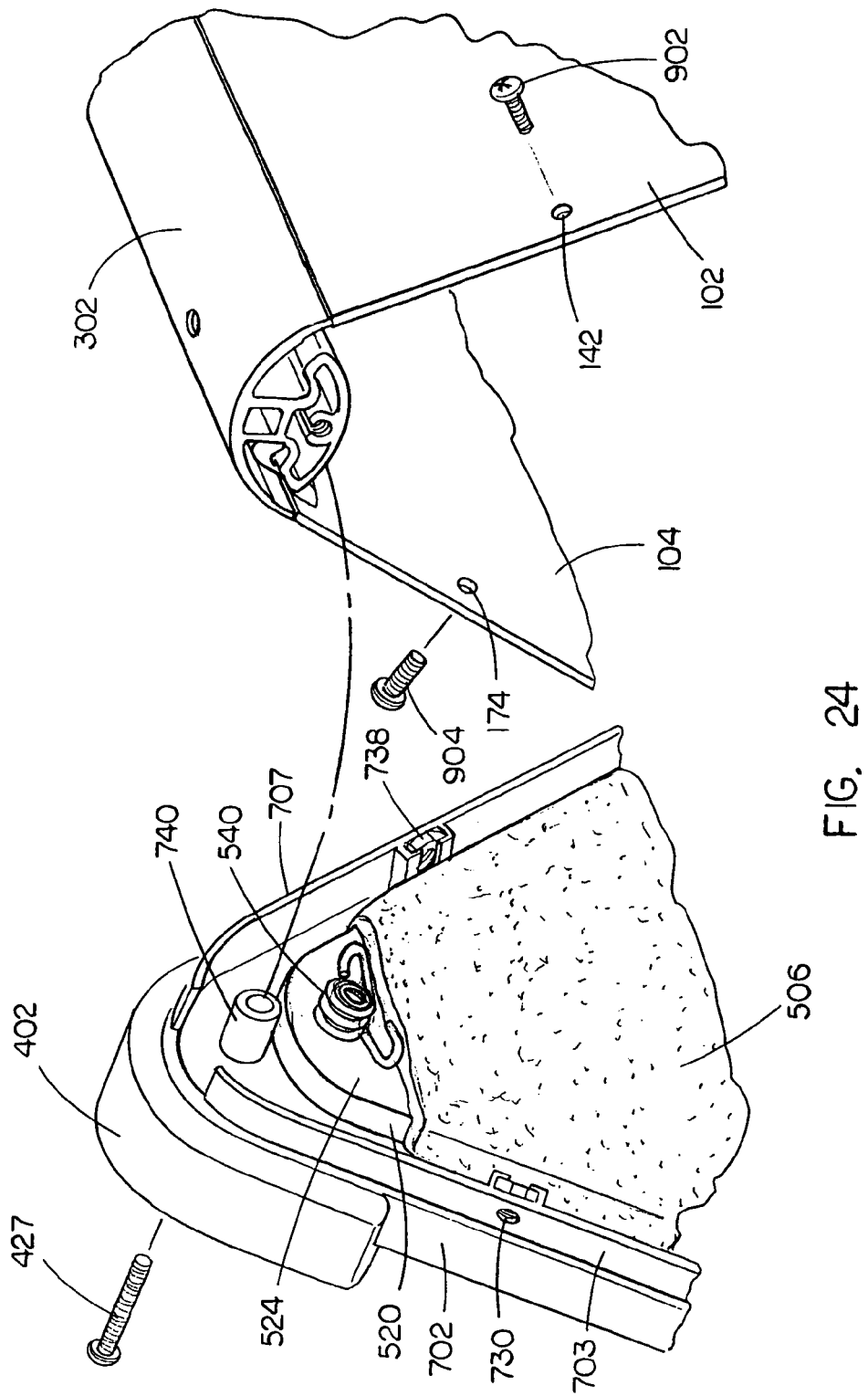
FIG. 24 is an expanded view of the coupling of the corner of the end panel coupled with the filter assembly and corner cap, with the extruded tube assembly which is further coupled with the side panels.
Figure 25:
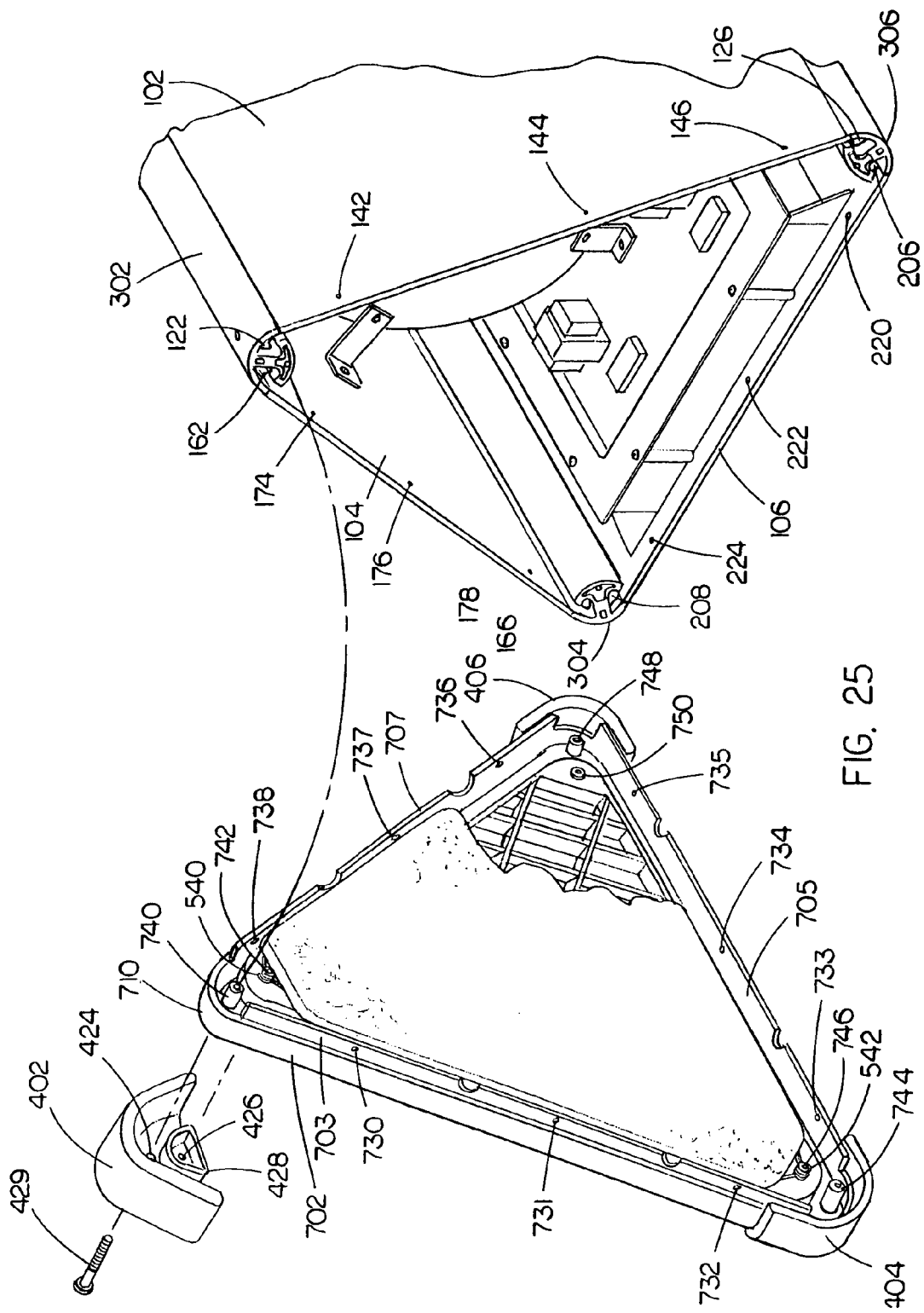
FIG. 25 illustrates the coupling of the end panel with the side panels and bottom panels of the present invention.

In the current embodiment, an air filtration system 500, of the air filtration unit 100, includes the blower 501 which, during operation, draws air through a first filter assembly 502 and a second filter assembly 508. The blower 501 is advantageously sized to accommodate the limited available space for its mounting. Thus, the blower 501, by design, provides maximum suction and exhaust capability while occupying a limited volume of space. After the air is at least partially filtered by the first or second filter assemblies the blower 501 then exhausts the air through the exhaust conduit 116 to which the blower 501 is coupled. As shown in FIG. 3, the first filter assembly 502 includes a first coarse filter 504 and a first fine filter 506, and the second filter assembly 508 includes a second coarse filter 510 and a second fine filter 512. The first filter assembly 502 is shown in FIG. 21 and will be described herein. It is understood that the second filter assembly is similar in all respects to the first filter assembly.

The first and second filter assembly configuration maximizes the air filtering capacity of the present invention by providing coarse and fine filters which maximize their exposed surface areas. In this manner the coarse and fine filters may be enabled to collect as much airborne material as possible while maintaining a configuration suitable for use with the configuration of the air filtration unit 100. The air filtration unit 100 may be designed for consumer use and therefore may accommodate consumer needs by limiting its size dimensions. Within this limited framework the filter assemblies may provide the maximum filter surface areas thereby increasing the amount of filtered air which is circulated to the work environment. Additionally, the filter assemblies may provide filters which increase the time between the need to change the filters due to debris accumulation within the filters. This may reduce costs to the user of the air filtration unit 100. The accumulation of debris within the filters of the filter assemblies may be monitored by a dust indication assembly, as will be described below. Further, the blower configuration is designed to maximize the amount of air which may be drawn through the filter assemblies within the limited dimensional framework of the air filtration unit 100.

In the preferred embodiment, the filter assemblies are configured to provide the coarse and fine filters in a generally perpendicular orientation to the exhaust conduit 116. Thus, it is seen that the first and second inlet gates of the end panels are established in a similar, generally perpendicular orientation, with respect to the exhaust conduit 116. It is contemplated that the flow pattern of the air, which is established by the blower 501, through use of the blower 501 drawing air through the first and second filter assemblies and then exhausting the at least partially filtered air through the exhaust conduit 116 may advantageously maximize the air filtering capacity of the air filtration unit 100.

The first fine filter 506 includes a rim 520. The rim 520 is composed of a rubber material and defines the shape and circumference of the first fine filter 506. The rim 520 is generally triangular in shape, defined by a first corner 522, a second corner 526 and a third corner 530. Additionally, the first corner 522 is disposed with a first fastening assembly 524, the second corner 526 is disposed with a second fastening assembly 528, and the third corner 530 is disposed with a third fastening assembly 532. Each fastening assembly provides a fastening point through which a fastener may be inserted and assist in securing the position of the first fine filter 506.

In the current embodiment, the rim 520 defines a recessed area within which the first coarse filter 504 may be located.

The position of the first coarse filter 504 within the rim 520 of the first fine filter 506 may be determined by the first, second, and third fastening assemblies which may provide a surface upon which the first coarse filter 504 may be disposed. The first coarse filter 504, being generally configured to be inserted, within the recessed area of the first fine filter 506 and rest against the fastening assemblies. The first coarse filter 504 includes a first corner 513 with a first fastening point 514, a second corner 515 with a second fastening point 516, and a third corner 517 with a third fastening point 518. In operation, the first coarse filter 504 is inserted within the rim 520 of the first fine filter 506 and the first, second, and third fastening points of the first coarse filter 504 operationally align with the first, second, and third fastening assemblies of the first fine filter 506. Thus, as seen in FIGS. 22 through 25, the first filter assembly 502 may couple with the first end panel 702. The first, second, and third fastening points and fastening assemblies align with the corner second protracted member 742, 746, and 750, respectively. This alignment enables the first, second, and third fastening points and fastening assemblies to slidably engage with the corner second protracted members. The sliding engagement, in the current embodiment, is defined by the corner second protracted members inserting through the first, second, and third fastening points and fastening assemblies. A first tension clip 540, second tension clip 542, and third tension clip 544 engage the corner second protracted members 742, 746, and 750, respectively, after the first filter assembly 502 is slidably engaged, and secures the position of the first filter assembly 502 relative to the first end panel 702. It is contemplated that the first and second filter assemblies may be removed from the first and second end panels, thereby, enabling replacement of the fine and coarse filters.

In operation, the air filter system is a two stage air filtration system where the air from the environment passes through the coarse and fine filters of the first or second filter assemblies before being exhausted back out into the environment. For example, the first inlet gate 112 may allow air into the first filter assembly. The air is first passed through the first coarse filter 504 and then the air is passed through the first fine filter 506. After passing through the first fine filter 506 the air is then exhausted by the blower 501 forcing the air out the exhaust port 116. Alternatively, the second inlet gate 114 allows air into the second filter assembly 508. The air is first passed through the second coarse filter 510 and then the air is passed through the second fine filter 512. After passing through the second fine filter 512 the air is then exhausted by the blower 501 forcing the air out the exhaust port 116. The fine filters provide a second filtering of the air before the blower forces the filtered air out of the air filtration unit, through the exhaust port 116 coupled with the screen 118, and back into the environment.

It is contemplated that the air filtration system, of the present embodiment, may be enabled using various air filtration technologies, such as ionic filters, and the like, without departing from the scope and spirit of the present invention. Alternatively, the air filtration unit 100 may employ various different filter technologies together in order to comprise the first or second filter assembly 502 or 508. For example, the coarse filter may be provided as a screen filter and the fine filter may be established as an ionic filter. It is further contemplated that the coarse and fine filters may be coupled within the air filtration unit 100 independently of one another. For example, the coarse filter may be removed without requiring the removal of the fine filter. Thus, the coarse filter may be replaced at different times relative to the fine filter. Additionally, access to the coarse and fine filters of the first and second filter assemblies may be variously configured. For instance, the fine filter may be fastened directly to various components of the air filtration unit 100 while the coarse filter may be inserted and removed within a filter receiver established within various components of the air filtration unit 100.

The air filtration unit 100 further includes a light assembly 600. The lighting assembly 600 includes a lamp plate 602, a lamp frame 604, and a cover plate 606. The lamp plate 602 includes a top side 603 and a bottom side 605, said top side 603 is disposed with a blower mounting assembly 610 for enabling the coupling of the blower upon the lamp plate 602. In the preferred embodiment the blower mounting assembly 610 includes a first mounting member 612 and a second mounting member 614. The bottom side 605 includes a first lamp mount 620 and a second lamp mount 622. The first and second lamp mounts are preferably standard lamp mounting assemblies enabled to couple and operate a first lamp 624 and a second lamp 626, respectively. It is understood that the number and types of lamps which may be coupled with the first and second lamp mounts may vary as contemplated by those of ordinary skill in the relevant art.

The lamp plate 602 is further disposed with a plurality of lamp plate fastening points 630, 631, 632, 633, 634, 635, 636, 637, 638, and 639 to enable the securing of the lamp plate 602 with the bottom panel 106. The plurality of lamp plate fastening points may be engaged by a plurality of fasteners, such as a bolt, screw, clip, pin, and the like. In operation, the plurality of lamp plate fastening points 630 through 639 align with the plurality of bottom panel lamp plate fastening points 852 through 870. The fasteners engage through the plurality of lamp plate fastening points to engage with the plurality of bottom panel lamp plate fastening points.

The lamp frame 604 is adjustably coupled with the bottom panel 108 to provide cover for and access to the first and second lamp 624 and 626. The lamp frame 604 includes a ledge 610 disposed about the circumferences of the aperture defined by the lamp frame 604. The ledge 610 may be engaged by the cover plate 606. In operation, the cover plate 606 may rest on the ledge 610. It is understood that the cover plate 606 is composed of a transparent or semi-transparent material which enables the passage of the light provided by the first and second lamp 624 and 626. For instance, the cover plate 606 may be a lexan plate, glass plate, and the like.

To enable the adjustable coupling of the lamp frame 604 with bottom panel 106, the lamp frame 604 includes a first hinge assembly 660 and a second hinge assembly 662. The first and second hinge assemblies secure the lamp frame 604 with the bottom panel 106 and enable the lamp frame 604 to swing open and shut relative to the bottom panel 106. The lamp frame 604 further includes a first clip 664 and a second clip 666, disposed on the opposite side of the lamp frame 604 from the first and second hinge assemblies. The first and second clips enable the user of the air filtration unit 100 to open and close the lamp frame 604. In a closed position, the first and second clips engage with a first and second protruding member 247 and 249, respectively, in order to secure the closed position of the lamp frame 604. The operator may engage the first and second clips, by pressing against them, thereby releasing the clips from their engagement with the first and second protruding members and enabling the establishment of the lamp frame 604 in an open position. It is contemplated that various adjustable coupling assemblies may be employed to secure the lamp frame 604 with the bottom panel 106.

It is understood that the open position is established when the lamp frame 604 is only coupled to the bottom panel 106 by the first and second hinge assemblies. Thus, the end of the lamp frame 604 which includes the first and second clips, is not coupled to the bottom panel 106. The first and second hinge assemblies allow the second end 609 to rotate away from the bottom panel 106 and may establish the light frame 604 in a generally perpendicular orientation relative to the bottom panel 106. The closed position is enabled when the lamp frame 604 is coupled to the bottom panel 106 by the first and second hinge assemblies and the first and second clips. This position is enabled by the hinge assemblies establishing the lamp frame 604 in a generally parallel orientation relative to the bottom panel 106. It is contemplated that the various adjustable coupling assemblies employed may enable more than two positions for the lamp frame 604 relative to the bottom panel 106. Further, the adjustable coupling assemblies may enable the removal of the lamp frame 604 from the bottom panel 106 and the retrofitting of a secondary lamp frame with the bottom panel 106.

It is contemplated that the air filtration unit 100 may include a dirty air filter indicator. The dirty air filter indicator may provide a method for users of the air filtration unit 100 to monitor the dirtiness of the air filter assemblies including the coarse and fine filters. The dirty air filter indicator may be a gradient system where the amount of air that is passing through the air filters determines the gradient. When the air filters are clean the gradient remains high due to the higher volume of air passing through, however, as the air filters become more clogged with dirt the amount of air passing through the air filters reduces and there is a concomitant reduction in the gradient. The gradient system employed may be replaced by various calibration systems or other systems as may be contemplated by one of ordinary skill in the art. It is further contemplated that the dirty air filter indicator may be enabled to separately monitor the coarse and fine filters relative to one another. Additionally, the dirty air filter indicator may be enabled to separately monitor the first filter assembly relative to the second filter assembly.

It is believed that the air filtration unit of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An air filtration unit for use in a work environment, comprising:
    a housing including a plurality of panels generally configured in a triangular shape, the panels defining a first end and a second end, the first and second ends having a substantially triangular cross-section;
    a two stage air filtration system, coupling a first filter assembly with a first end panel at the first end and a second filter assembly with a second end panel at the second end, the first and second filter assemblies being disposed within the housing;
    a blower assembly, including a motor, disposed within the housing, the blower assembly for drawing air from the work environment through the first and second filter assemblies into the housing;
    an exhaust conduit coupled with the blower, the exhaust conduit for allowing the blower assembly to blow the at least partially filtered air back out into the work environment, the blower exhausting the at least partially filtered air via the exhaust conduit in a direction substantially perpendicular to a direction of incoming airflow;
    a light assembly disposed in the housing, for providing light to the work environment; and
    a plurality of extruded tube assemblies for coupling the plurality of panels of the housing together,
    wherein the two stage air filter system at least partially filters the air from the work environment within the area illuminated by the light assembly.

2. The air filtration unit of claim 1, wherein the first filter assembly includes a first coarse filter coupled with a first fine filter, coupled with the first end panel and the second filter assembly includes a second coarse filter coupled with a second fine filter, coupled with the second end panel.

3. The air filtration unit of claim 1, wherein the housing further includes a dirty air filter indicator for indicating when the first and second filter assemblies are dirty and need replacing.

4. The air filtration unit of claim 1, wherein the first filter assembly is removable from the first end panel and the second filter assembly is removable from the second end panel.

5. The air filtration unit of claim 1, further comprising:
    a first selector assembly for selecting the operation of the motor of the blower assembly; and
    a second selector assembly for selecting the operation of the light assembly.

6. The air filtration unit of claim 1, wherein the housing further includes a handle.

7. The air filtration unit of claim 1, wherein the air filtration unit further comprises a power cord for providing power to the blower and is at least one of retractable into the housing and capable of wrapping around the handle.

8. The air filtration unit of claim 1, wherein the air filtration unit further comprises a mounting assembly disposed on at least one of the plurality of extruded tube assemblies.

9. The air filtration unit of claim 1, wherein a plurality of corner caps couple with the plurality of panels and plurality of extruded tube assemblies.

10. The air filtration unit of claim 1, further comprising a power outlet disposed on the housing, the power outlet being suitable for providing a power source for equipment being utilized by a user.

11. An air filtration unit for use in a work environment, comprising:
    a first end panel and a second end panel coupled via a plurality of extruded tube assemblies with a first side panel, a second side panel, and a bottom panel, the first and second end panels for providing an inlet gate for the air in the work environment the first and second end panels defining a first end and a second end and having a substantially triangular cross-section;
    a first filter assembly including a first coarse filter and a first fine filter, coupled with the first end panel at the first end, the first filter assembly for providing a two stage filtering of air in the work environment;

a second filter assembly including a second coarse filter and a second fine filter, coupled with the second end panel at the second end, the second filter assembly for providing a two stage filtering of air in the work environment;

a light assembly coupled with the bottom panel, including a lamp plate, the light assembly for providing light to the work environment;

a blower assembly including a motor and an exhaust conduit, coupled with the lamp plate, the blower assembly for drawing air from the work environment through the first and second filter assemblies and blowing the at least partially filtered air back out into the work environment via the exhaust conduit, the blower exhausting the at least partially filtered air via the exhaust conduit in a direction substantially perpendicular to a direction of incoming airflow; and a plurality of corner caps coupled with the first and second end panels, the plurality of corner caps for protecting the panels of the air filtration unit, wherein the first and second filter assemblies at least partially filter the air from the work environment within the area illuminated by the light assembly.

12. The air filtration unit of claim 11, wherein the first side panel and second side panel further include a handle.

13. The air filtration unit of claim 11, wherein the air filtration unit further comprises a power cord for providing power to the blower and is at least one of retractable into the housing and capable of wrapping around the handle.

14. The air filtration unit of claim 11, further comprising:
a first selector assembly for selecting the operation of the motor of the blower assembly; and
a second selector assembly for selecting the operation of the light assembly.

15. The air filtration unit of claim 11, wherein the air filtration unit further comprises a mounting assembly disposed on at least one of the plurality of extruded tube assemblies.

16. An air filtration unit for a work environment, comprising:
means for filtering air in a work environment, the filtering means including a two-stage air filtration system, including a first filter assembly and a second filter assembly;
means for lighting the work environment;
means for housing the air filtration means and the lighting means, the housing means including a plurality of panels, the plurality of panels defining a first end and a second end, at least one of the panels included in the plurality of panels being configured with a handle;
a blower assembly, including a motor, disposed within the housing means, the blower assembly for drawing air from the work environment through the first and second filter assemblies into the housing means; and
a plurality of corner caps counted with at least one of the panels included in the plurality of panels for protecting the panels of the air filtration unit;
wherein at least partially filtered air is exhausted from the housing means in a direction substantially perpendicular to a direction of incoming air flow.

17. The air filtration unit of claim 16, wherein the lighting means comprises a light assembly including a light coupled with a lamp plate, the lamp plate couples with the bottom panel.

18. The air filtration unit of claim 16, wherein a power source assembly comprising a power cord and a selector assembly are coupled with the housing means, air filtration means, and the lighting means.

19. The air filtration unit of claim 18, wherein the power cord is retractable into the housing.

20. The air filtration unit of claim 18, wherein the selector assembly is a multi-position switch assembly operationally coupled with the power cord.

* * * * *